US011105307B2

(12) United States Patent
Willis

(10) Patent No.: US 11,105,307 B2
(45) Date of Patent: Aug. 31, 2021

(54) METHOD AND SYSTEMS FOR A MULTI-NEEDLE FUEL INJECTOR

(71) Applicant: Transportation IP Holdings, LLC, Norwalk, CT (US)

(72) Inventor: Jeffrey David Willis, Harborcreek, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 137 days.

(21) Appl. No.: 15/875,787

(22) Filed: Jan. 19, 2018

(65) Prior Publication Data

US 2018/0223784 A1    Aug. 9, 2018

Related U.S. Application Data

(60) Provisional application No. 62/454,401, filed on Feb. 3, 2017.

(51) Int. Cl.
*F02M 61/18* (2006.01)
*F02M 61/14* (2006.01)
*F02B 23/06* (2006.01)

(52) U.S. Cl.
CPC ..... *F02M 61/1813* (2013.01); *F02B 23/0669* (2013.01); *F02M 61/14* (2013.01); *F02M 61/182* (2013.01); *F02M 2200/46* (2013.01); *F02M 2200/50* (2013.01); *Y02T 10/12* (2013.01)

(58) Field of Classification Search
CPC .. F02M 61/182; F02M 61/1813; F02M 61/14; F02M 2200/46; F02M 2200/50; F02M 45/086; Y02T 10/125; F02B 23/0669; F02D 41/405
See application file for complete search history.

(56) References Cited

U.S. PATENT DOCUMENTS

| | | | |
|---|---|---|---|
| 5,458,292 A | 10/1995 | Hapeman | |
| 6,220,528 B1 | 4/2001 | Cooke et al. | |
| 6,769,635 B2 | 8/2004 | Stewart et al. | |
| 2002/0000216 A1* | 1/2002 | Ismailov | F02M 61/18 123/305 |
| 2005/0252490 A1* | 11/2005 | Magel | F02M 45/086 123/446 |
| 2010/0133361 A1* | 6/2010 | Futonagane | F02M 63/0225 239/533.12 |
| 2016/0237972 A1* | 8/2016 | Kawakami | F02M 45/086 |

* cited by examiner

*Primary Examiner* — Tuongminh N Pham
(74) *Attorney, Agent, or Firm* — McCoy Russell LLP

(57) ABSTRACT

Various methods and systems are provided for a fuel injector. In one example, a fuel injector includes a nozzle tip including a plurality of injection holes, a first needle biased against the nozzle tip via a first biasing member positioned within a first control volume, and a second needle surrounding a portion of the first needle and biased against the first needle and the nozzle tip via a second biasing member positioned within a second control volume. A needle actuator may be energized for different durations of time in order to move one or more of the first needle and the second needle relative to the nozzle tip.

9 Claims, 13 Drawing Sheets

METHOD AND SYSTEMS FOR A MULTI-NEEDLE FUEL INJECTOR

CROSS REFERENCE TO RELATED APPLICATIONS

The present application claims priority to U.S. Provisional Patent Application No. 62/454,401, entitled "METHOD AND SYSTEMS FOR A MULTI-NEEDLE FUEL INJECTOR," filed Feb. 3, 2017, the entire contents of which are hereby incorporated by reference for all purposes.

BACKGROUND

Technical Field

Embodiments of the subject matter disclosed herein relate to engine fuel injection.

Discussion of Art

A fuel system of an internal combustion engine may include one or more fuel injectors configured to flow fuel from a common fuel rail to combustion chambers of the engine. In some examples, the engine may be a dual-fuel engine capable of combusting gaseous fuel, liquid fuel, or a combination of gaseous fuel and liquid fuel. During some engine operating conditions, a relatively large amount of liquid fuel may be injected into a combustion chamber through holes of a nozzle of a fuel injector in what is sometimes referred to as a main injection. During other engine operating conditions, a relatively small amount of liquid fuel may be injected into the combustion chamber through the holes of the fuel injectors in what is sometimes referred to as a pilot injection in order to combust gaseous fuel within the combustion chambers.

BRIEF DESCRIPTION

In one embodiment, a fuel injector includes: a nozzle tip including a plurality of injection holes; a first needle biased against the nozzle tip via a first biasing member positioned within a first control volume; and a second needle surrounding a portion of the first needle and biased against the first needle and the nozzle tip via a second biasing member positioned within a second control volume.

DETAILED DESCRIPTION

The following description relates to various embodiments of a multi-needle fuel injector for a fuel system of an engine. In one embodiment, a fuel injector includes a nozzle tip including a plurality of injection holes, a first needle biased against the nozzle tip via a first biasing member positioned within a first control volume, and a second needle surrounding a portion of the first needle and biased against the first needle and the nozzle tip via a second biasing member positioned within a second control volume. In one example, the first biasing member and second biasing members may be springs or similar mechanical elements. Further, in one embodiment, the plurality of injection holes may all be arranged at an end of the nozzle tip. In another embodiment, the plurality of injection holes may include a first group of injection holes arranged at the end of the nozzle tip and a second group of injection holes arranged further upstream in the nozzle tip relative to the first group of injection holes.

As used herein, "upstream" and "downstream" refer to the location of a component, part or feature relative to a flow path (e.g., fluid flow path such as air or liquid flow). For example, a first component that is said to be upstream of a second component may be ahead of the second component in a direction a flow through a passage, part, system, or component in which the first and second components are positioned. In this way, when traveling along a flow path of a passage, part, system, component, or the like, the flow (such as air or liquid) may first encounter the upstream, first component and then the downstream, second component.

Figure 1:
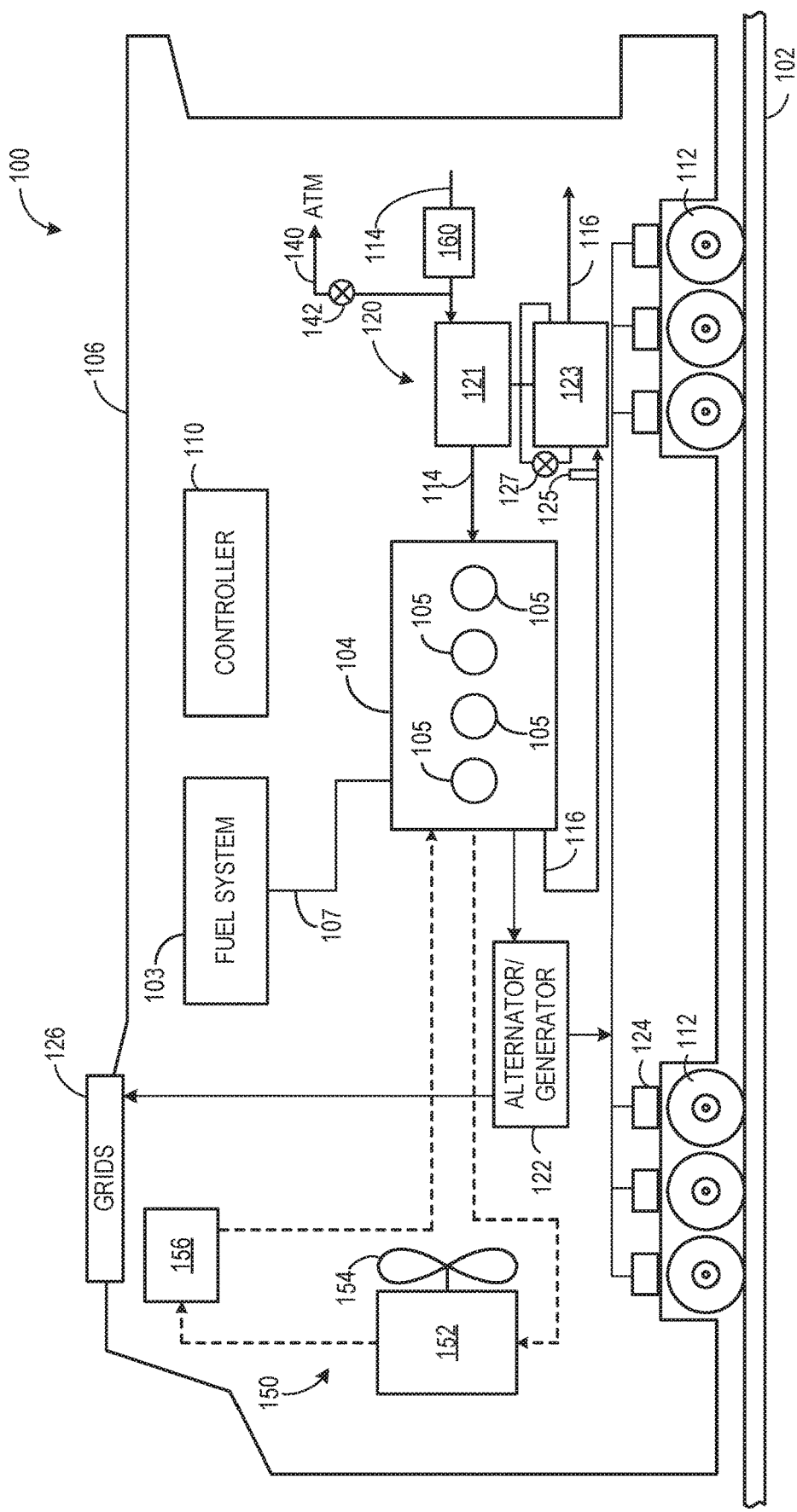
FIG. 1 shows a schematic diagram of a vehicle including an engine and a fuel injection system, according to an embodiment of the invention.
Figure 2:
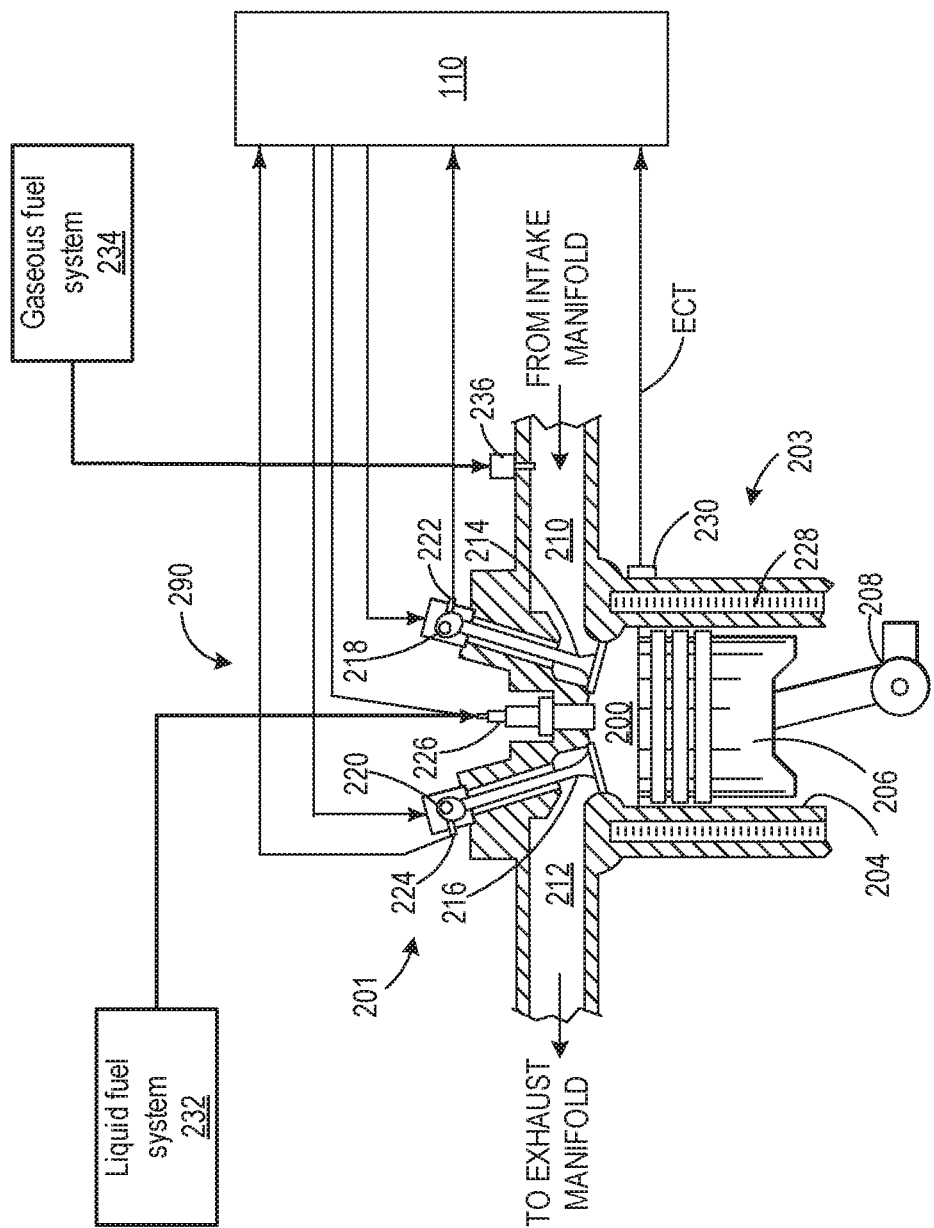
FIG. 2 shows a schematic diagram of an example cylinder of an engine and a fuel injection system, according to an embodiment of the invention.
Figure 3:
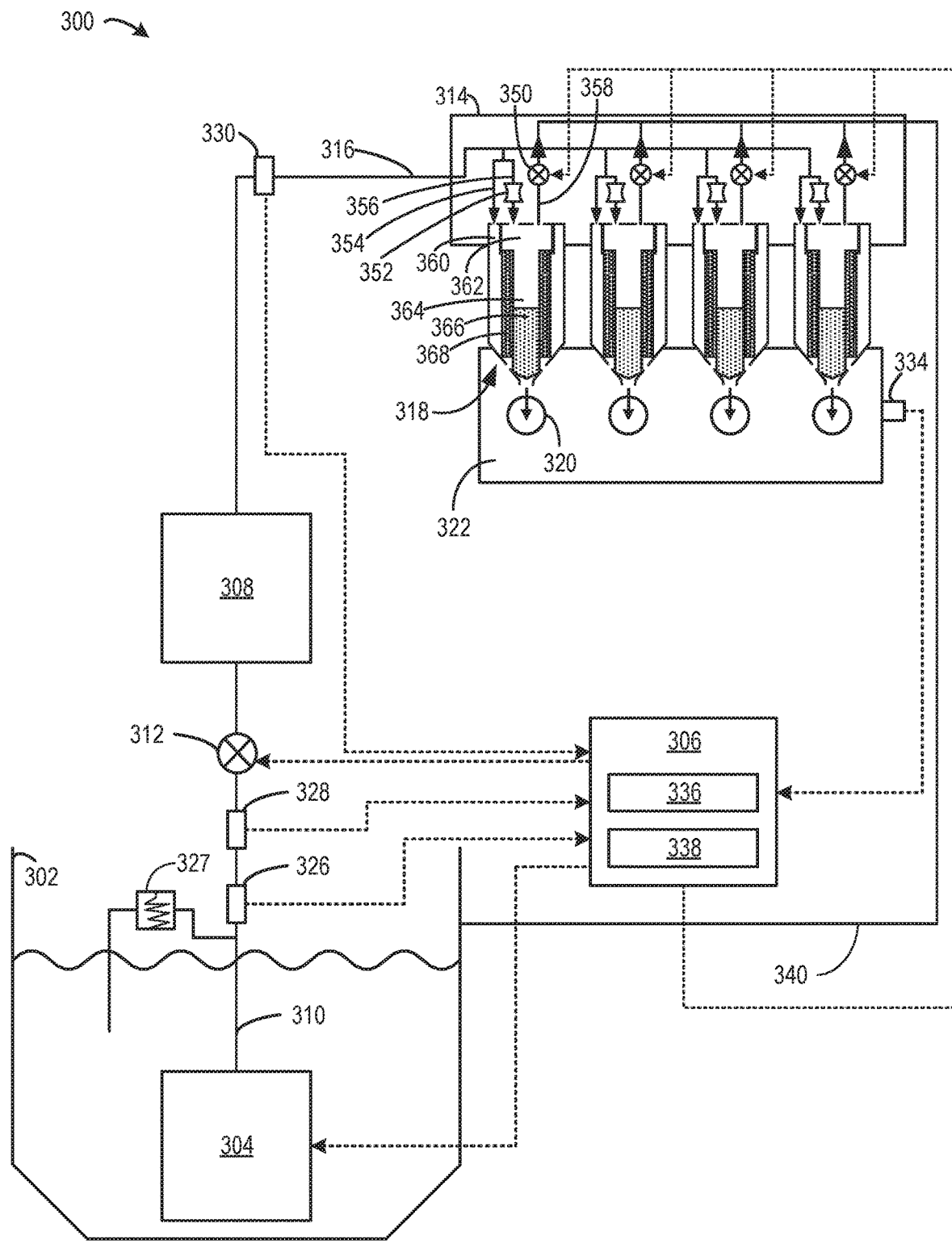
FIG. 3 shows a schematic diagram of a fuel injection system for an engine including at least one multi-needle fuel injector, according to an embodiment of the invention.
Figure 4:
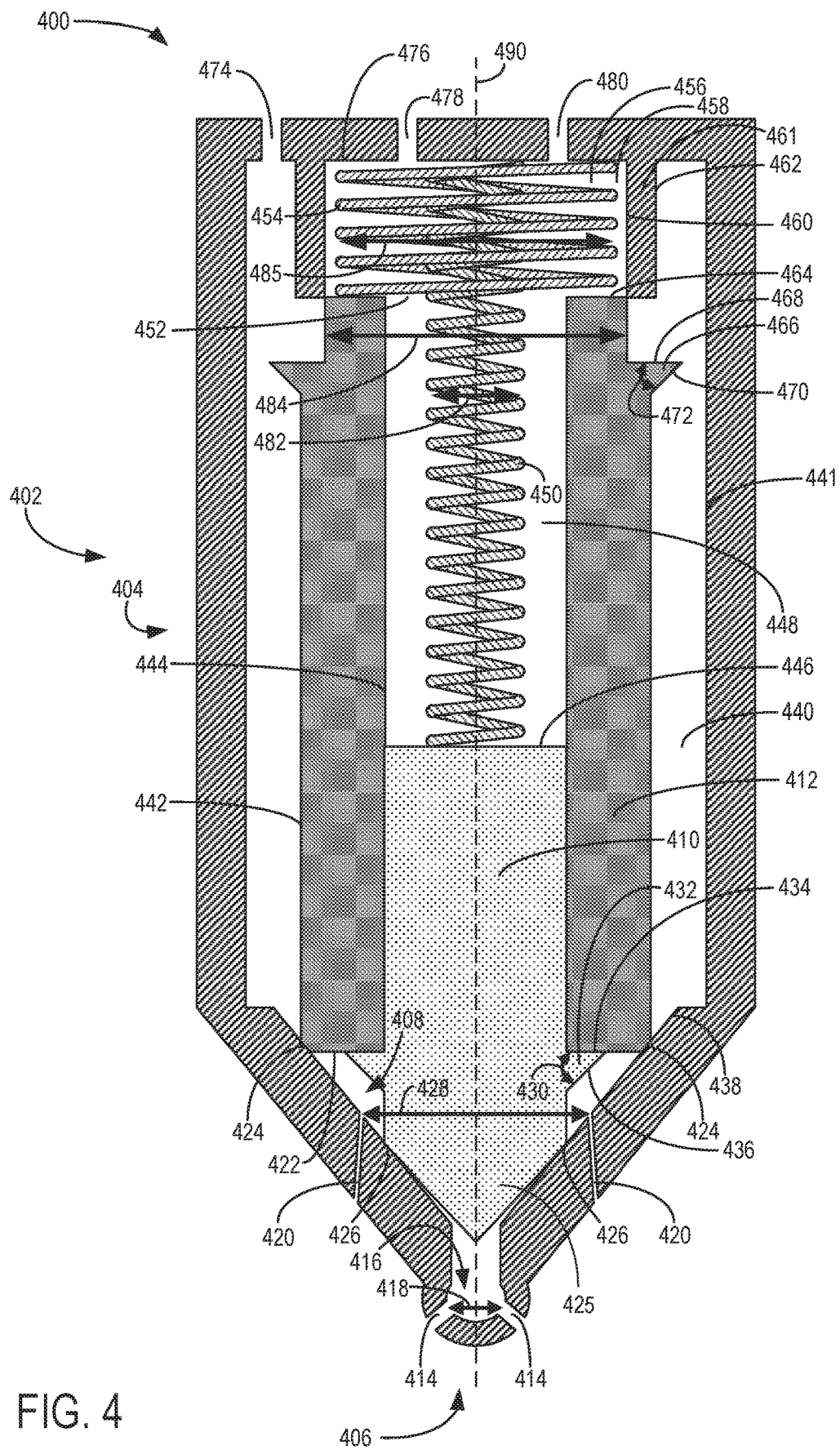
FIG. 4 shows a first example of a multi-needle fuel injector for a fuel injection system, according to an embodiment of the invention.
Figure 5:
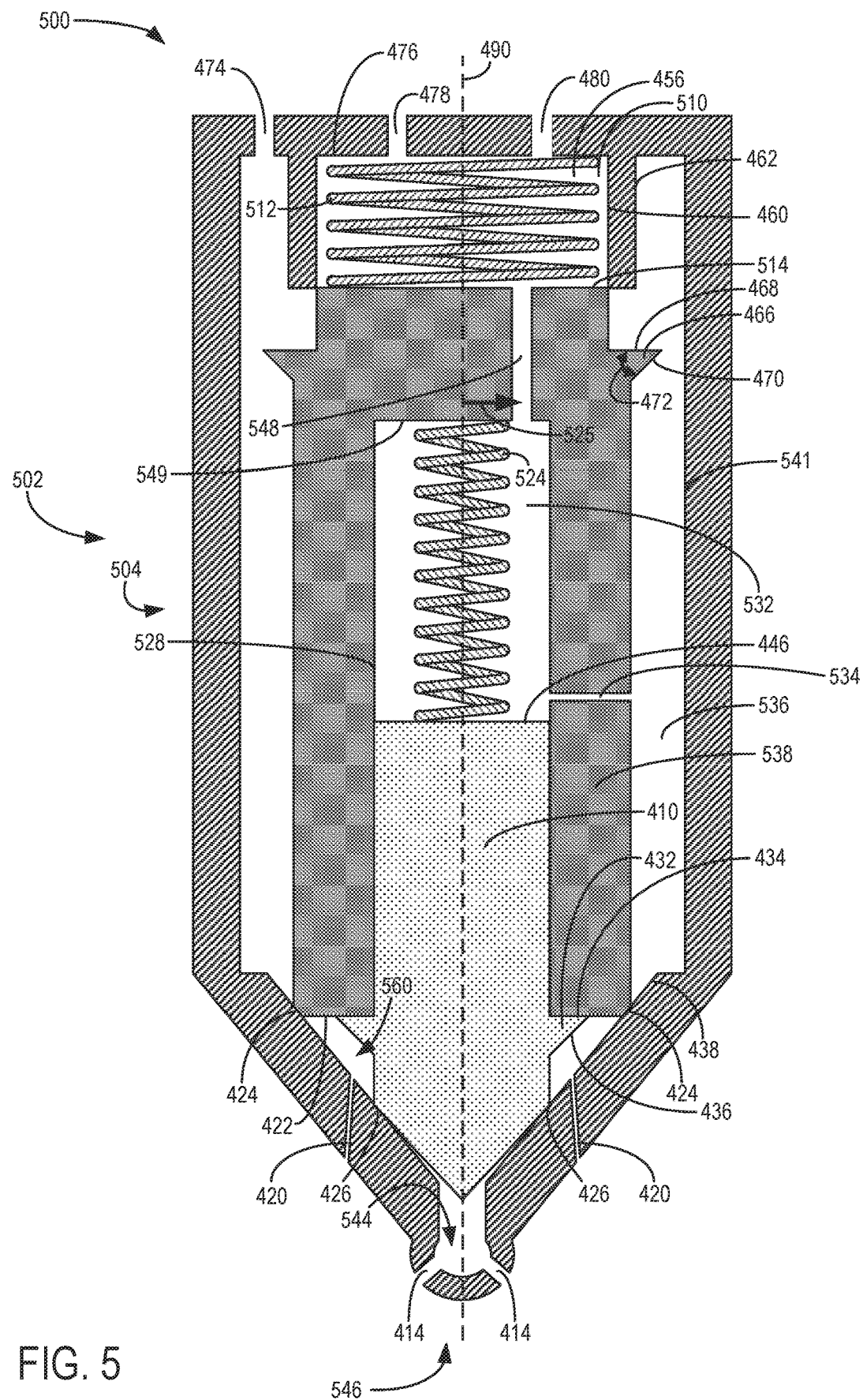
FIG. 5 shows a second example of a multi-needle fuel injector for a fuel injection system, according to an embodiment of the invention.
Figure 6:
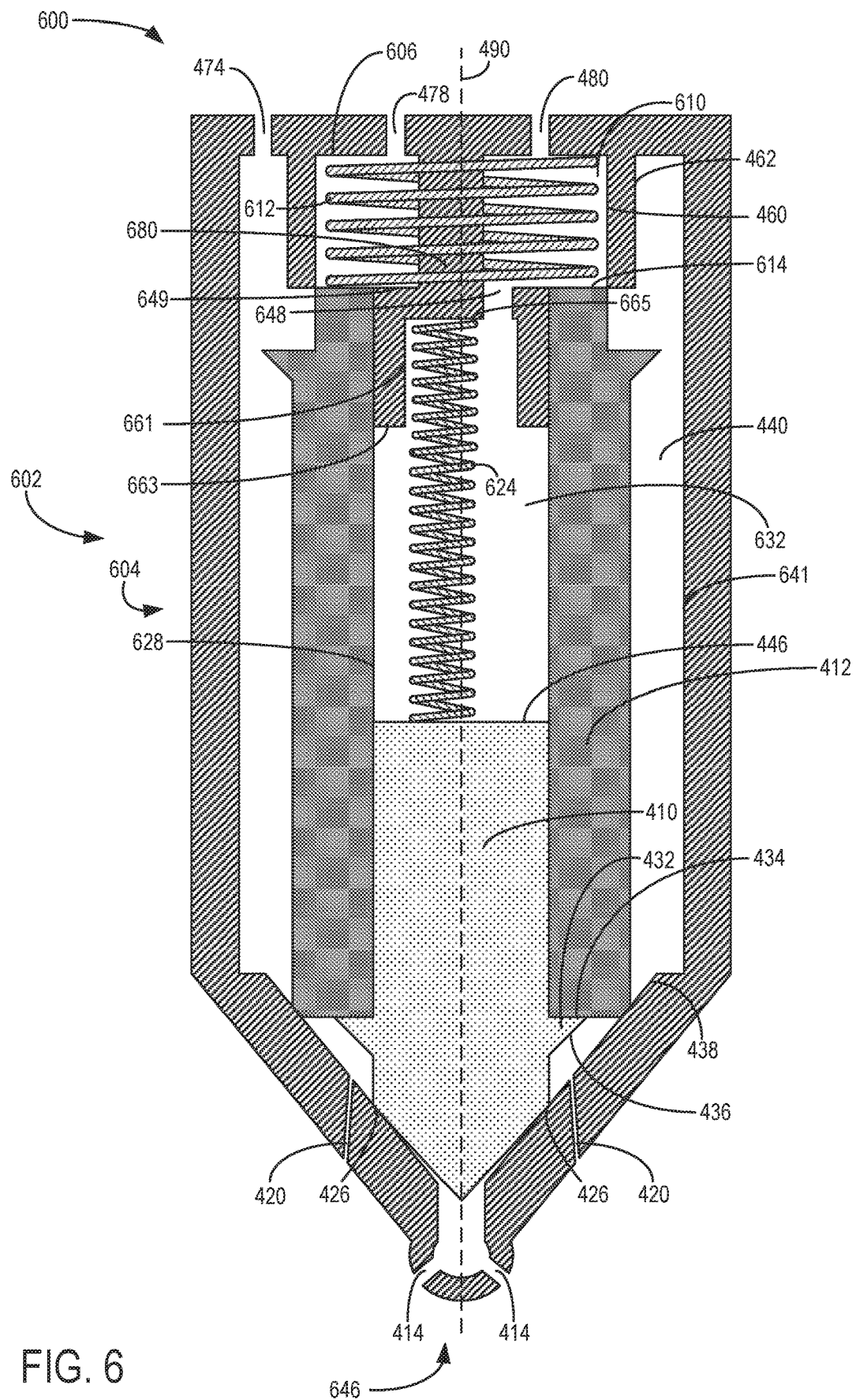
FIG. 6 shows a third example of a multi-needle fuel injector for a fuel injection system, according to an embodiment of the invention.
Figure 7:
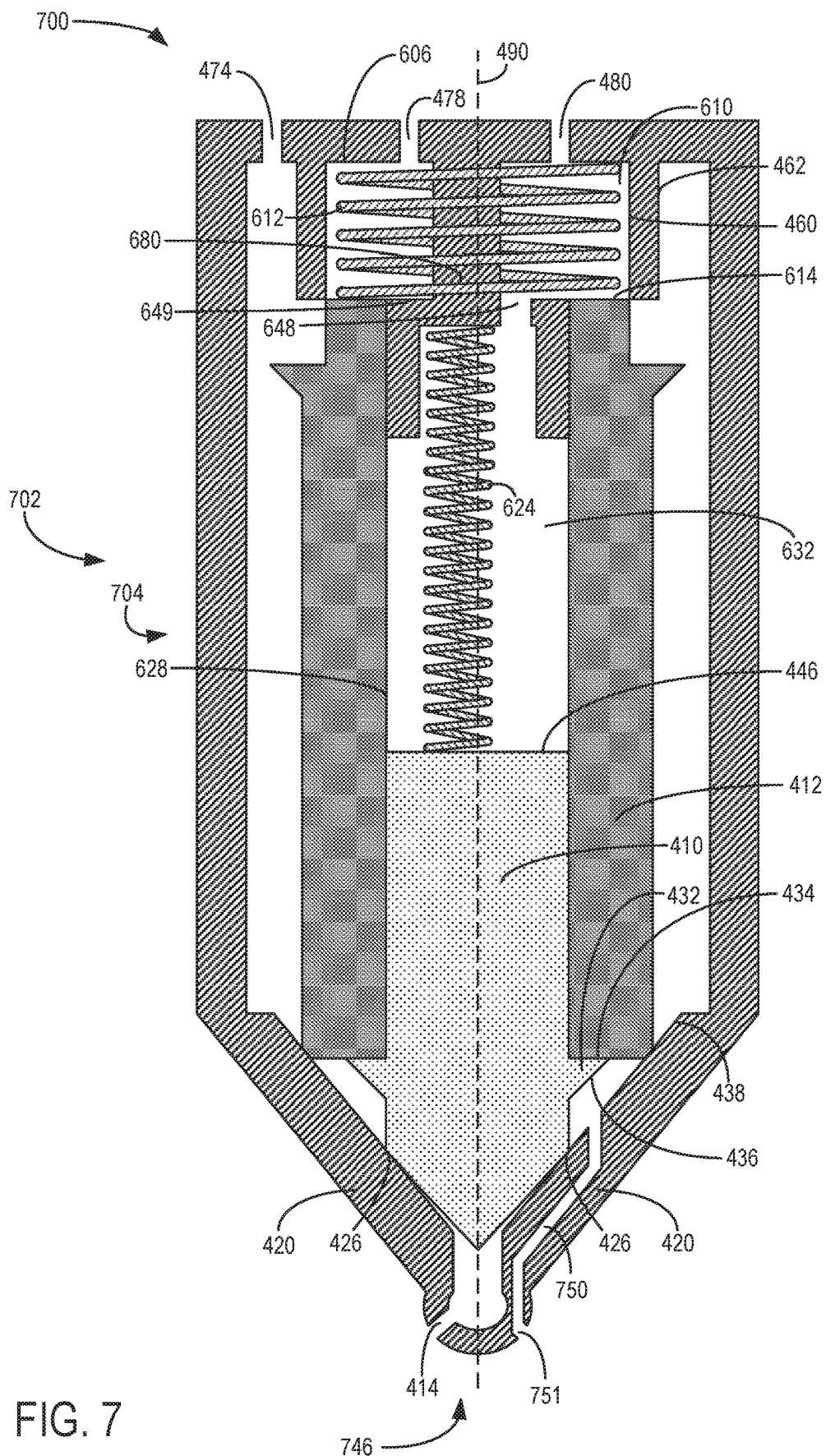
FIG. 7 shows a fourth example of a multi-needle fuel injector for a fuel injection system, according to an embodiment of the invention.
Figure 8:
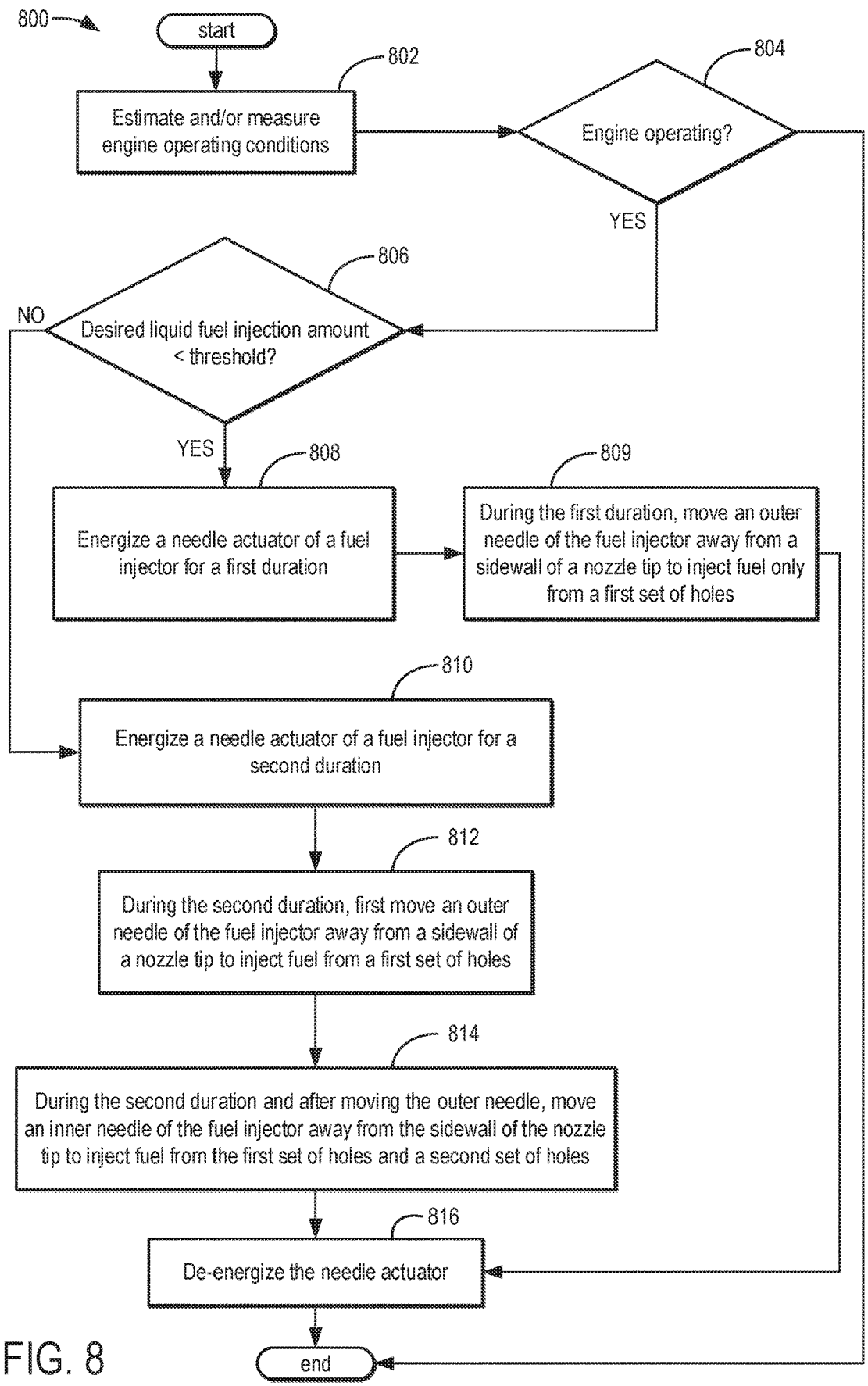
FIG. 8 shows an example method for flowing fuel through a multi-needle fuel injector in response to energization of a needle actuator of the multi-needle fuel injector, according to an embodiment of the invention.
Figure 9:
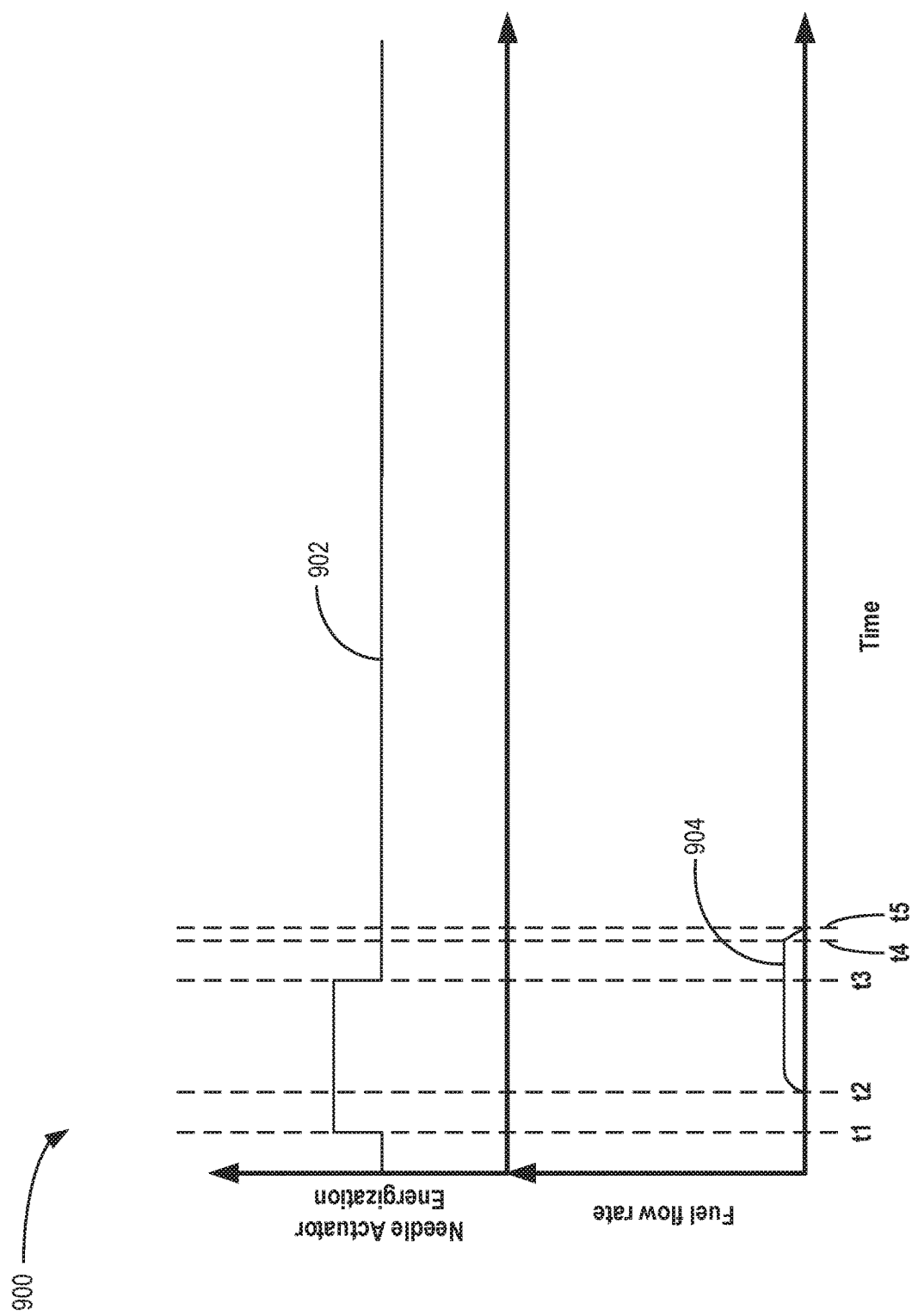
FIG. 9 shows a first example flow rate of fuel from a multi-needle fuel injector in response to an energization time of a needle actuator of the multi-needle fuel injector, according to an embodiment of the invention.
Figure 10:
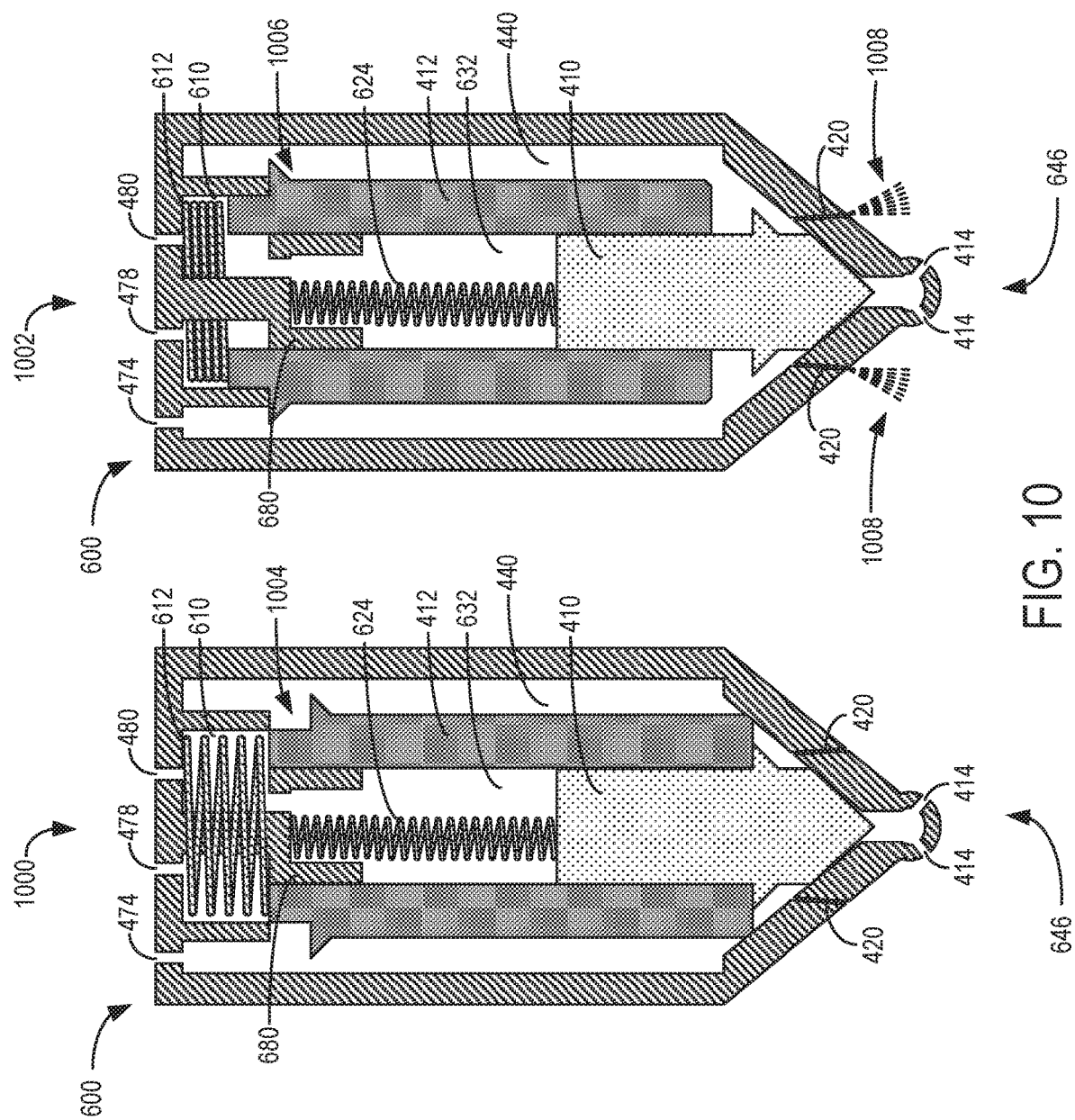
FIG. 10 shows a first example of fuel flowing from a multi-needle fuel injector, according to an embodiment of the invention.
Figure 11:
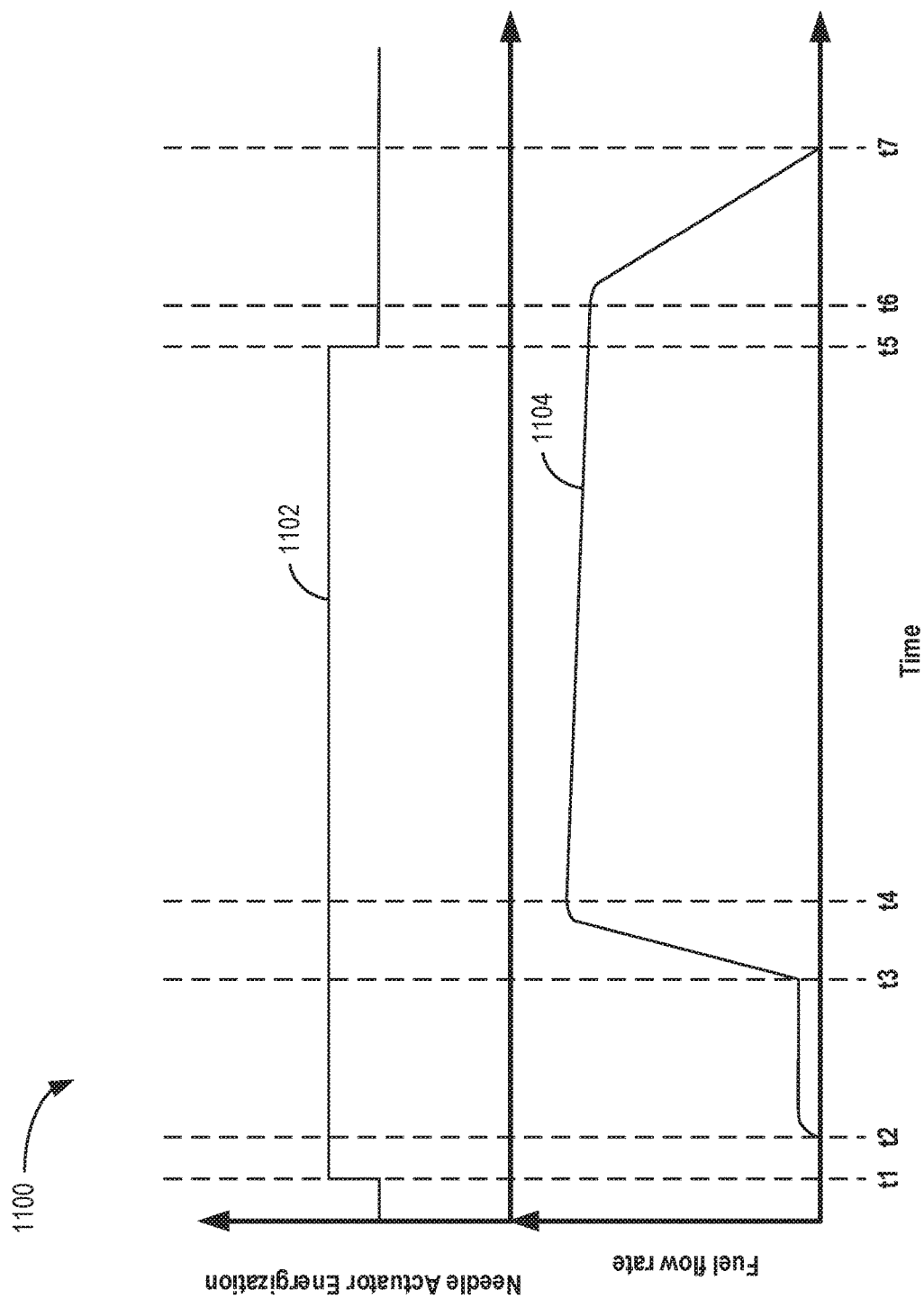
FIG. 11 shows a second example flow rate of fuel from a multi-needle fuel injector in response to an energization time of a needle actuator of the multi-needle fuel injector, according to an embodiment of the invention.
Figure 12:
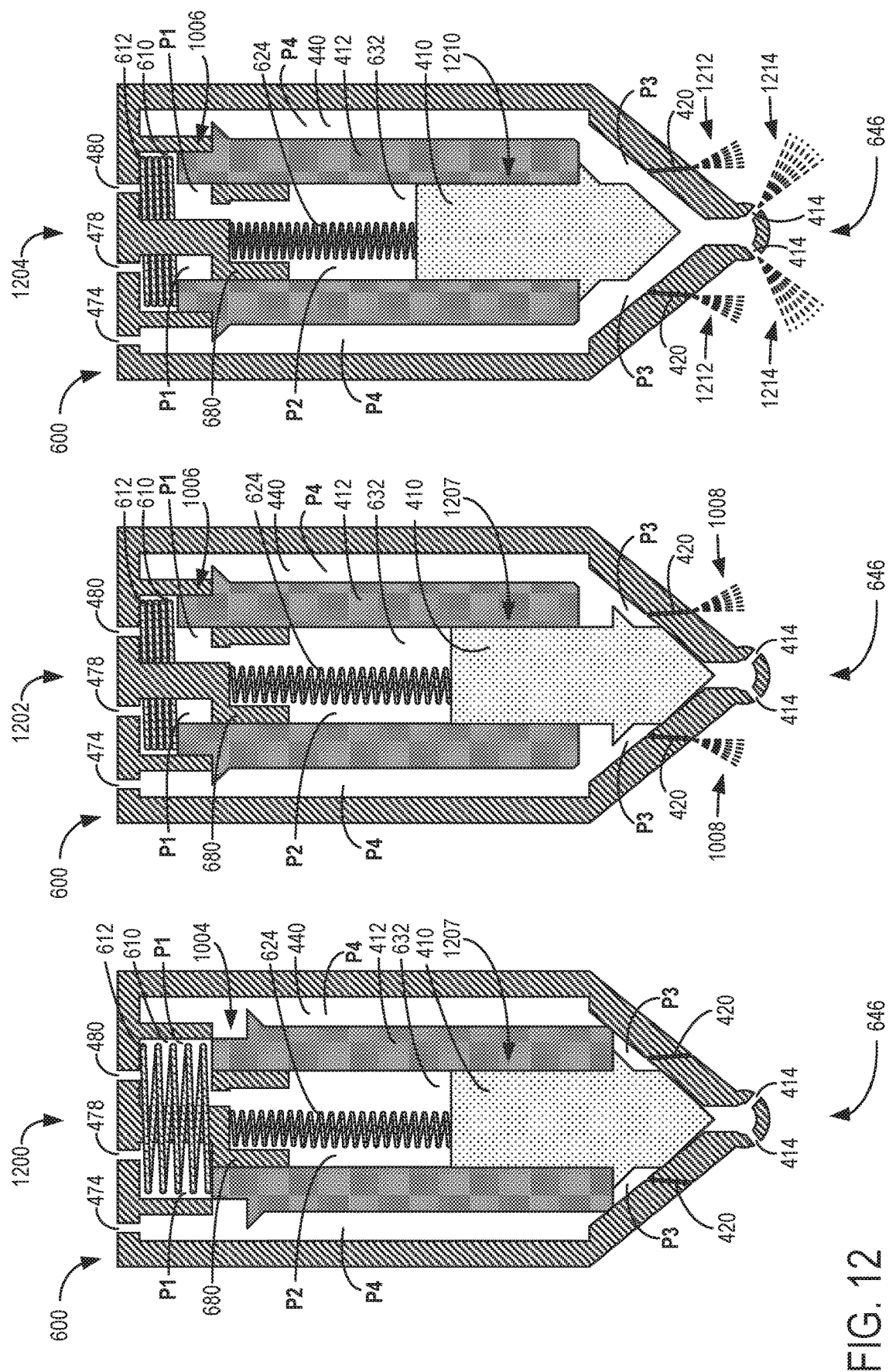
FIG. 12 shows a second example of fuel flowing from a multi-needle fuel injector, according to an embodiment of the invention.
Figure 13:
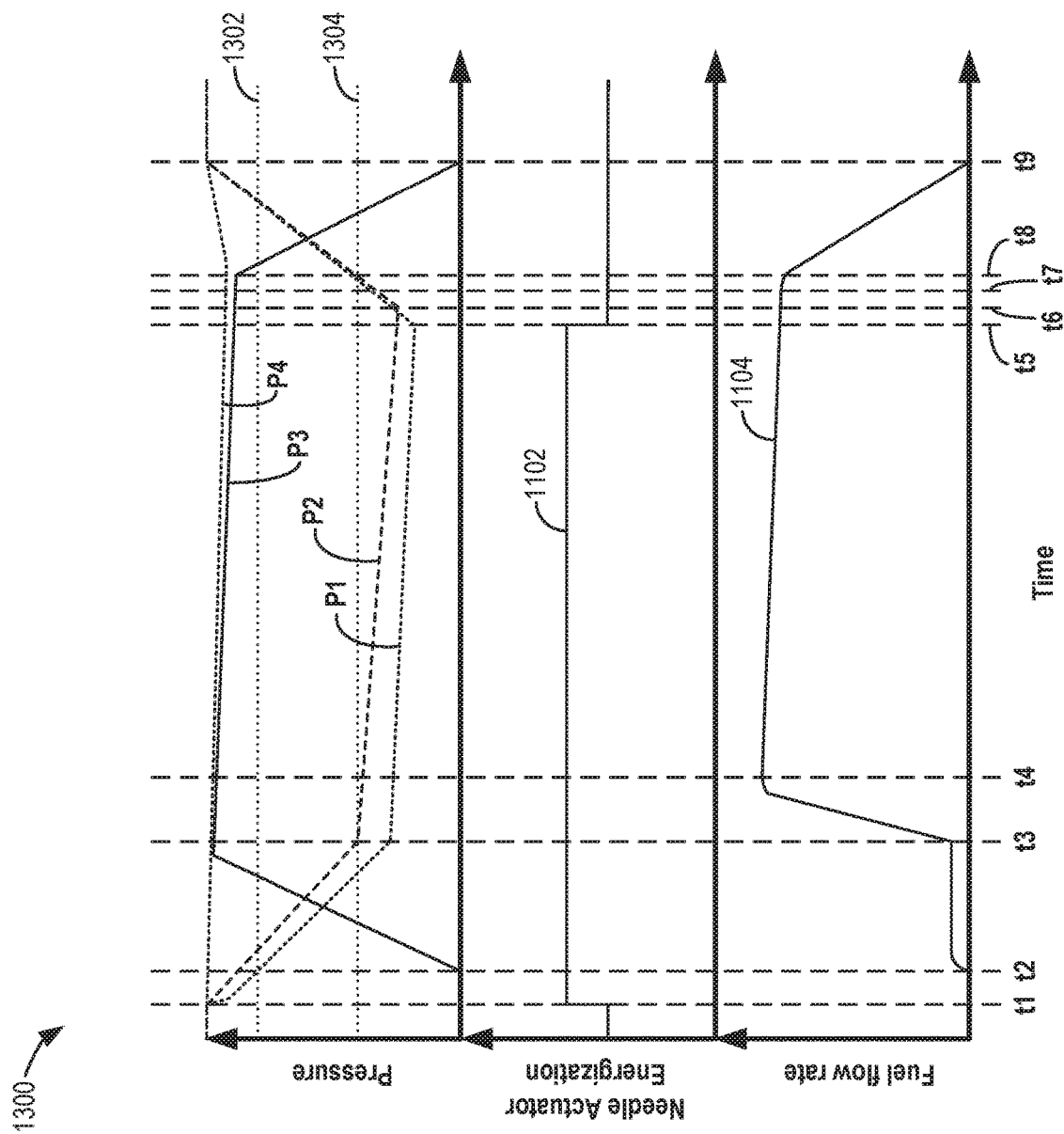
FIG. 13 shows relative pressures within control volumes of a multi-needle fuel injector in response to a fuel flow through the multi-needle fuel injector, according to an embodiment of the invention.

Example fuel systems including a common fuel rail and a plurality of fuel injectors are shown by FIGS. 1-3. FIGS. 4-7 show different embodiments of a multi-needle fuel injector that may be included in the fuel systems shown in FIGS. 1-3. Specifically, FIGS. 4-6 show embodiments of the multi-needle fuel injector where the plurality of injection holes are separated into two groups positioned at different ends of a nozzle tip of the injector and that have different diameters. FIG. 7 shows another embodiment of the multi-needle fuel injector where the plurality of injection holes are all located at an end of the needle tip, but a subset of those injection holes are routed through a sidewall of the nozzle tip and are in fluid communication with a fuel passage of the fuel injector further upstream than the remaining injection holes. FIG. 8 shows a method for operating the multi-needle fuel injectors. Additionally, FIGS. 9-13 show various needle actuator energization times, fuel flow rates, and fuel pressures for an example multi-needle fuel injector during operation of the multi-needle fuel injector. FIGS. 9-10 show a fuel flow rate and relative needle position for the multi-needle fuel injector for a first needle actuator energization duration, and FIGS. 11-13 show a fuel flow rate and relative needle position for the multi-needle fuel injector for a second needle actuator energization duration.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of a multi-needle fuel injector for a fuel system of an engine, an example of a fuel system of an engine is disclosed. For example, FIG. 1 shows a block diagram of an embodiment of a vehicle system 100 (e.g., engine system), herein depicted as a rail vehicle 106 (e.g., locomotive), configured to run on a rail 102 via a plurality of wheels 112. As depicted, the rail vehicle includes an engine 104, and the engine includes a plurality of combustion chambers 105 (e.g., cylinders). In other non-limiting embodiments, the engine may be a stationary engine, such as in a power-plant application, or an engine in a marine vessel or other off-highway vehicle propulsion system or systems as noted above. The cylinders of the engine are configured to receive fuel (e.g., diesel fuel) from a fuel system 103 via a fuel conduit 107. In some examples, the fuel conduit may be coupled with a common fuel rail and a plurality of fuel injectors, as shown in the examples shown by FIGS. 2-3 and described further below.

The engine receives intake air for combustion from an intake passage 114. The intake passage receives ambient air from an air filter 160 that filters air from outside of the rail vehicle. The intake passage may include and/or be coupled to an intake manifold of the engine. Exhaust gas resulting from combustion in the engine is supplied to an exhaust passage 116. Exhaust gas flows through the exhaust passage, and out of an exhaust stack of the rail vehicle. In one example, the engine is a multi-fuel engine that combusts air and two or more fuels through compression ignition. For example, the engine may combust two or more fuels including gasoline, kerosene, natural gas (e.g., gaseous fuel), biodiesel, or other petroleum distillates of similar density through compression ignition (and/or spark ignition, and/or other forms of ignition such as laser, plasma, or the like). As explained further below, the engine may operate in a multi-fuel mode where two or more fuels are simultaneously combusted in engine cylinders or in a single-fuel mode where only a single fuel is combusted in the engine cylinders. In one embodiment, the single-fuel mode may be a diesel fuel mode where 100% diesel fuel is combusted at the engine cylinders. In another example, the engine may be a dual fuel engine that combusts a mixture of gaseous fuel and diesel fuel. As used herein, a substitution ratio may refer to a ratio or percentage of a secondary fuel (such as gaseous fuel) to diesel fuel combusted at the engine cylinders.

In one example, the rail vehicle is a diesel-electric vehicle. As depicted in FIG. 1, the engine is coupled to an electric power generation system, which includes an alternator/generator 122 and electric traction motors 124. In one example, the alternator/generator may include a direct current (DC) generator. For example, the engine may be a diesel and/or natural gas engine that generates a torque output that is transmitted to the electric generator which is mechanically coupled to the engine. As explained above, the engine may be a multi-fuel engine operating with diesel fuel and natural gas, but in other examples the engine may use other straight/mono fuels such as gasoline, diesel, or natural gas, or may use various combinations of fuels other than diesel and natural gas.

The generator produces electrical power that may be stored and applied for subsequent propagation to a variety of downstream electrical components. As an example, the generator may be electrically coupled to a plurality of traction motors and the generator may provide electrical power to the plurality of traction motors. As depicted, the plurality of traction motors are each connected to one wheel of the plurality of wheels to provide tractive power to propel the rail vehicle. One example configuration includes one traction motor per wheel set. As depicted herein, six pairs of traction motors correspond to each of six pairs of motive wheels of the rail vehicle. In another example, alternator/generator may be coupled to one or more resistive grids 126. The resistive grids may be configured to dissipate excess engine torque via heat produced by the grids from electricity generated by the alternator/generator.

The vehicle system may include a turbocharger 120 that is arranged between the intake passage and the exhaust passage. In alternate embodiments, the turbocharger may be replaced with a supercharger. The turbocharger increases air charge of ambient air drawn into the intake passage in order to provide greater charge density during combustion to increase power output and/or engine-operating efficiency. As shown in FIG. 1, the turbocharger includes a compressor 121 (disposed in the intake passage) which is at least partially driven by a turbine 123 (disposed in the exhaust passage). While in this case a single turbocharger is included, the system may include multiple turbine and/or compressor stages. A temperature sensor 125 is positioned in the exhaust passage, upstream of an inlet of the turbine. In this way, the temperature sensor may measure a temperature of exhaust gases entering the turbine. As shown in FIG. 1, a wastegate 127 is disposed in a bypass passage around the turbine and may be adjusted, via actuation from controller 110, to increase or decrease exhaust gas flow through the turbine. For example, opening the wastegate (or increasing the amount of opening) may decrease exhaust flow through the turbine and correspondingly decrease the rotational speed of the compressor. As a result, less air may enter the engine, thereby decreasing the combustion air-fuel ratio.

The vehicle system also includes a compressor bypass passage 140 coupled directly to the intake passage, upstream of the compressor and upstream of the engine. In one example, the compressor bypass passage may be coupled to the intake passage, upstream of the intake manifold of the engine. The compressor bypass passage is additionally coupled to atmosphere, or exterior to the engine. In an alternate embodiment, the compressor bypass passage may be coupled to the intake passage, upstream of the compressor, and the exhaust passage, downstream of the turbine. In yet another embodiment, the compressor bypass passage may instead be an engine bypass passage coupled to the intake passage, downstream of the compressor (and have an engine bypass valve disposed therein) and thus divert airflow away from the engine after the airflow has passed through the compressor.

The compressor bypass passage is configured to divert airflow (e.g., from before the compressor inlet) away from the engine (or intake manifold of the engine) and to atmosphere. In the embodiment where the passage is instead an engine bypass passage, the engine bypass passage is configured to divert boosted airflow (e.g., from the compressor outlet) away from the engine and to atmosphere. A compressor bypass valve (CBV) 142 is positioned in the compressor bypass passage and includes an actuator actuatable by the controller to adjust the amount of intake airflow diverted away from the engine and to atmosphere. In one example, the compressor bypass valve may be a two-position, on/off valve. In another example, the compressor bypass valve may be a continuously variable valve adjustable into a fully open position, fully closed position, and a plurality of positions between fully open and fully closed. When the compressor bypass valve is in the fully closed (or closed) position, airflow may be blocked from flowing to atmosphere via the compressor bypass passage. As a result, all of the intake airflow may travel to the compressor and then to the engine for combustion in the engine cylinders.

In some embodiments, the vehicle system may further include an aftertreatment system coupled in the exhaust passage upstream and/or downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or systems.

The vehicle system shown in FIG. 1 does not include an exhaust gas recirculation (EGR) system. However, in alternate embodiments, the vehicle system may include an EGR system coupled to the engine, which routes exhaust gas from the exhaust passage of the engine to the intake passage downstream of the turbocharger. In some embodiments, the exhaust gas recirculation system may be coupled exclusively to a group of one or more donor cylinders of the engine (also referred to a donor cylinder system).

As depicted in FIG. 1, the vehicle system further includes a cooling system 150. The cooling system circulates coolant through the engine to absorb waste engine heat and distribute the heated coolant to a heat exchanger, such as a radiator 152. A fan 154 may be coupled to the radiator in order to maintain an airflow through the radiator when the vehicle is moving slowly or stopped while the engine is running. In some examples, fan speed may be controlled by the controller. Coolant which is cooled by the radiator enters a tank 156. The coolant may then be pumped by a water, or coolant, pump (not shown) back to the engine or to another component of the vehicle system.

The rail vehicle further includes the engine controller (referred to herein as the controller) to control various components related to the rail vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of rail vehicle operation.

The controller may receive information from a plurality of sensors and may send control signals to a plurality of actuators. The controller, while overseeing control and management of the rail vehicle, may be configured to receive signals from a variety of engine sensors, as further elaborated herein, in order to determine operating parameters and operating conditions, and correspondingly adjust various engine actuators to control operation of the rail vehicle. For example, the engine controller may receive signals from various engine sensors including, but not limited to, engine speed, engine load (derived from fueling quantity commanded by the engine controller, fueling quantity indicated by measured fuel system parameters, averaged mean-torque data, and/or electric power output from the alternator or generator), mass airflow amount/rate (e.g., via a mass airflow meter), intake manifold air pressure, boost pressure, exhaust pressure, ambient pressure, ambient temperature, exhaust temperature (such as the exhaust temperature entering the turbine, as determined from the temperature sensor), particulate filter temperature, particulate filter back pressure, engine coolant pressure, exhaust oxides-of-nitrogen quantity (from NOx sensor), exhaust soot quantity (from soot/particulate matter sensor), exhaust gas oxygen level sensor, or the like. Correspondingly, the controller may control the rail vehicle by sending commands to various components such as the traction motors, the alternator/generator, cylinder valves, fuel injectors, a notch throttle, the compressor bypass valve (or an engine bypass valve in alternate embodiments), a wastegate, or the like. Other actively operating and controlling actuators may be coupled to various locations in the rail vehicle. In one example, adjusting an amount of intake airflow diverted away from the intake manifold and to atmosphere (and thus the amount of boosted intake airflow entering the engine) may include adjusting an actuator of the compressor bypass valve to adjust the amount of airflow bypassing the engine via the compressor bypass passage.

FIG. 2 depicts an embodiment of a combustion chamber, or cylinder 200, of a combustion system 290. In one example, the combustion system may be included within the engine described above with reference to FIG. 1. The cylinder may be capped by a cylinder head 201. The cylinder head houses the intake and exhaust valves and liquid fuel injector, described below, and is coupled to a cylinder block 203 forming the cylinder.

The engine may be controlled at least partially by a control system including a controller (e.g., such as the controller shown by FIG. 1 and described above) which may be in further communication with a vehicle system including the engine, such as the locomotive described above with reference to FIG. 1. As described above, the controller may further receive signals from various engine sensors including, but not limited to, engine speed, engine load, boost pressure, exhaust pressure, turbocharger speed, ambient pressure, CO2 levels, exhaust temperature, NOx emission, engine coolant temperature (ECT) from temperature sensor 230 coupled to cooling sleeve 228, or the like. Correspondingly, the controller may control the vehicle system by sending commands to various components such as alternator, cylinder valves, throttle, fuel injectors, or the like.

The cylinder (i.e., combustion chamber) may include cylinder liner 204 with a piston 206 positioned therein. The piston may be coupled to a crankshaft 208 so that reciprocating motion of the piston is translated into rotational motion of the crankshaft. The crankshaft may include a crankshaft speed sensor for outputting a speed (e.g., instantaneous speed) of the crankshaft. In some embodiments, the engine may be a four-stroke engine in which each of the cylinders fires in a firing order during two revolutions of the crankshaft. In other embodiments, the engine may be a two-stroke engine in which each of the cylinders fires in a firing order during one revolution of the crankshaft.

The cylinder receives intake air for combustion from an intake including an intake passage 210. The intake passage receives intake air via an intake manifold. The intake passage may communicate with other cylinders of the engine in addition to the cylinder, for example, or the intake passage may communicate exclusively with the cylinder.

Exhaust gas resulting from combustion in the engine is supplied to an exhaust including an exhaust passage 212. Exhaust gas flows through the exhaust passage, to a turbocharger (not shown in FIG. 2) and to atmosphere, via an exhaust manifold. The exhaust passage may further receive exhaust gases from other cylinders of the engine in addition to the cylinder shown by FIG. 2, for example.

Each cylinder of the engine may include one or more intake valves and one or more exhaust valves. For example, the cylinder is shown including at least one intake poppet valve 214 and at least one exhaust poppet valve 216 located in an upper region of cylinder. In some embodiments, each cylinder of the engine, including the cylinder, may include at least two intake poppet valves and at least two exhaust poppet valves located at the cylinder head. In yet another embodiment, the engine may not include any poppet valves.

The intake valve may be controlled by the controller via an intake valve actuator 218. Similarly, the exhaust valve may be controlled by the controller via an exhaust valve actuator 220. During some conditions, the controller may vary the signals provided to the actuators to control the opening and closing of the respective intake and exhaust valves. The position of the intake valve and the exhaust valve may be determined by respective valve position sensors 222 and 224, respectively, and/or by cam position sensors. The valve actuators may be of the electric valve actuation type or cam actuation type, or a combination thereof, for example. In yet another example, the intake and exhaust valves shown in FIG. 2 may be mechanically actuated via a rotating camshaft and valvetrain to control opening and closing the valves. In this way, the intake valve actuator and exhaust valve actuator may be in the form of a camshaft and valvetrain.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In still further embodiments, a mechanical cam lobe may be used to open and close the intake and exhaust valves. Additionally, while a four-stroke engine is described above, in some embodiments a two-stroke engine may be used, where the intake valves are dispensed with and ports in the cylinder wall are present to allow intake air to enter the cylinder as the piston moves to open the ports. This can also extend to the exhaust, although in some examples exhaust valves may be used.

Each cylinder of the engine is coupled with one or more fuel injectors for providing fuel thereto. As a non-limiting example, FIG. 2 shows the cylinder including a fuel injector 226. The fuel injector is shown coupled directly to the cylinder for injecting fuel directly therein. In this manner, the fuel injector provides what is known as direct injection of a fuel into the combustion cylinder. The fuel may be delivered to the fuel injector from a first, liquid fuel system 232, which may include a fuel tank, fuel pumps, and a common fuel rail (examples of which are shown by FIG. 3 and described below). In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). In one example, the controller may control an amount, duration, timing, and spray pattern of fuel delivered to the cylinder via the fuel injector.

Further, each cylinder of the engine may be configured to receive gaseous fuel (e.g., natural gas) alternative to or in addition to diesel fuel. The gaseous fuel may be provided to the cylinder via the intake manifold. As shown in FIG. 2, the intake passage may receive a supply of gaseous fuel from a second, gaseous fuel system 234, via one or more gaseous fuel lines, pumps, pressure regulators, or the like, located upstream of the cylinder. In some embodiments, the gaseous fuel system may be located remotely from the engine, such as on a different vehicle (e.g., on a fuel tender car), and the gaseous fuel may be supplied to the engine via one or more fuel lines that traverse the separate vehicles. However, in other embodiments the gaseous fuel system may be located on the same vehicle as the engine.

A plurality of gas admission valves, such as gas admission valve 236, may be configured to supply gaseous fuel from the gaseous fuel system to each respective cylinder via respective intake passages. For example, a degree and/or duration of opening of the gas admission valve may be adjusted to regulate an amount of gaseous fuel provided to the cylinder. As such, each respective cylinder may be provided with gaseous fuel from an individual gas admission valve, allowing for individual cylinder control in the amount of gaseous fuel provided to the cylinders. However, in some embodiments, a single-point fumigation system may be used, where gaseous fuel is mixed with intake air at a single point upstream of the cylinders. In such a configuration, each cylinder may be provided with substantially similar amounts of gaseous fuel. To regulate the amount of gaseous fuel provided by the single-point fumigation system, in some examples a gaseous fuel control valve may be positioned at a junction between a gaseous fuel supply line and the engine intake air supply line or intake manifold. The gaseous fuel control valve degree and/or duration of opening may be adjusted to regulate the amount of gaseous fuel admitted to the cylinders. In other examples, the amount of gaseous fuel admitted to the cylinders in the single-point fumigation system may be regulated by another mechanism, such as control of a gaseous fuel regulator, via control of a gaseous fuel pump, or the like. As shown in FIG. 3, a fuel system includes a common fuel rail that provides fuel to a plurality of fuel injectors for fuel injection into cylinders of the engine. In one example, the fuel system includes an inlet metering valve (IMV) that is positioned between a low-pressure fuel pump and a high-pressure fuel pump. The IMV is operable to control fuel flow to the high-pressure fuel pump that supplies the common fuel rail with high pressure fuel. An amount of electrical current supplied to the IMV can be adjusted to vary a position of the IMV and hence vary an amount of fuel provided to the common fuel rail as operation conditions change.

FIG. 3 shows a schematic diagram of a fuel system 300, similar to the liquid fuel system shown by FIG. 2 and described above. In one example, the fuel system may be configured to flow fuel to one or more cylinders of an engine, such as the cylinders shown by FIGS. 1-2 and the engine shown by FIG. 1. Liquid fuel (e.g., diesel fuel) is sourced or stored in a fuel tank 302. A low-pressure fuel pump 304 is in fluid communication with the fuel tank. In this embodiment, the low-pressure fuel pump is disposed inside of the fuel tank and can be immersed below the liquid fuel level. In alternative embodiments, the low-pressure fuel pump may be coupled to the outside of the fuel tank and pump fuel through a suction device. Operation of the low-pressure fuel pump is regulated by a controller 306 (similar to the controllers described above with reference to FIGS. 1-2). In some examples, the low-pressure fuel pump may be driven by a torque output of the engine. In other examples, the low-pressure fuel pump may be electrically driven (e.g., powered by an alternator/generator, such as the alternator/generator shown by FIG. 1).

Liquid fuel is pumped by the low-pressure fuel pump from the fuel tank to a high-pressure fuel pump 308 through a first conduit 310. A valve 312 is disposed in the first conduit and regulates fuel flow through the first conduit. In one example, the valve in the first conduit is an inlet metering valve (IMV). The IMV is disposed upstream of the high-pressure fuel pump to adjust a flow rate of fuel that is provided to the high-pressure fuel pump and further to a common fuel rail 314 for distribution to a plurality of fuel injectors 318 for fuel injection into the engine cylinders. In one example, the IMV may be a solenoid valve, opening and closing of which is regulated by the controller. The controller may command the IMV to a fully closed position, a fully opened position, or a plurality of positions between fully closed and fully opened in order to control fuel flow to the high-pressure fuel pump at a desired fuel flow rate. During operation of the vehicle, the IMV is adjusted to meter fuel based on operating conditions, and during at least some conditions may be at least partially open. The IMV is one example of a control device for metering fuel. In other examples, a different control element may be employed without departing from the scope of this disclosure. For example, a position or state of the IMV may be electrically controlled by controlling an IMV electrical current. As another example, a position or state of the IMV may be mechanically controlled by controlling a servo motor that adjusts the IMV.

The high-pressure fuel pump increases fuel pressure in the conduit from a lower pressure to a higher pressure. Fuel flows into the high-pressure fuel pump at a first pressure and flows out of the high-pressure fuel pump at a second pressure, with the second pressure being greater than the first pressure. The high-pressure fuel pump is fluidly coupled with the common fuel rail. The high-pressure fuel pump delivers fuel to the common fuel rail through a second conduit 316. A plurality of fuel injectors are in fluid communication with the common fuel rail. Each of the plurality of fuel injectors delivers fuel to one of a plurality of engine cylinders 320 in an engine 322 (similar to the example cylinders described above with reference to FIGS. 1-2 and the engine described above with reference to FIG. 1). Fuel is combusted in the plurality of engine cylinders to provide power to the vehicle through an alternator and traction motors, for example (such as the alternator/generator and traction motors described above with reference to FIG. 1). Operation of the plurality of fuel injectors is regulated by the controller. In the embodiment shown by FIG. 3, the engine includes four fuel injectors and four engine cylinders. In alternate embodiments, more or fewer fuel injectors and engine cylinders can be included in the engine.

In some implementations, the common fuel rail is a single-walled fuel rail. The fuel system also may include single-walled conduits (e.g., the first conduit and/or second conduit may be single-walled) for delivering fuel to the common fuel rail. In some examples, the single-walled configuration may be employed to reduce a cost of the fuel system as well as to reduce weight of the fuel system, relative to a double-walled configuration.

Fuel pumped from the fuel tank to an inlet of the IMV by the low-pressure fuel pump may operate at what is referred to as a lower fuel pressure or supply fuel pressure. Correspondingly, components of the fuel system which are upstream of the high-pressure fuel pump operate in a lower fuel pressure or engine fuel pressure region. On the other hand, the high-pressure fuel pump may pump fuel from the lower fuel pressure to a higher fuel pressure or rail fuel pressure. Correspondingly, components of the fuel system which are downstream of the high-pressure fuel pump are in a higher-fuel pressure or rail fuel pressure region of the fuel system.

A fuel pressure in the lower fuel pressure region may be measured by a first pressure sensor 326 positioned in the first conduit. The pressure sensor sends a signal to the controller indicating a fuel pressure measured by the pressure sensor. In an alternative application, the pressure sensor may be in fluid communication with an outlet of the low-pressure fuel pump. A fuel temperature in the lower fuel pressure region may be measured by a first temperature sensor 328 positioned in first conduit. The first temperature sensor sends a signal to the controller indicating a fuel temperature measured by the temperature sensor upstream of the high-pressure fuel pump. The controller may additionally receive signals (e.g., electrical signals) from a fuel-level sensor 327 indicating a level (e.g., amount) of fuel contained in the fuel tank. In the example shown by FIG. 3, the fuel-level sensor is disposed within the fuel tank. In other examples, at least a portion of the fuel-level sensor may be positioned external to the fuel tank (e.g., at an exterior of the fuel tank).

A fuel pressure in the higher fuel pressure region may be measured by a second pressure sensor 330 positioned in the second conduit. The second pressure sensor sends a signal to the controller indicating a fuel pressure downstream of the high-pressure fuel pump as measured by the second pressure sensor. In an alternative application, the second pressure sensor may be in fluid communication with an outlet of the high-pressure fuel pump. Note that in some applications various operating parameters may be generally determined or derived indirectly in addition to or as opposed to being measured directly. The engine may additionally be coupled with a coolant temperature sensor 334 for measuring a temperature of the coolant within the engine.

In addition to the sensors mentioned above, the controller may receive various signals from a plurality of engine sensors coupled to the engine that may be used for assessment of fuel system operating conditions and associated engine operation. For example, the controller receives sensor signals indicative of air-fuel ratio, engine speed, engine load, engine temperature, ambient temperature, fuel value, a number of cylinders actively combusting fuel, and the like. In the illustrated implementation, the controller is a computing device, such as microcomputer that includes a processor unit 336, non-transitory computer-readable storage medium device 338, input/output ports, memory, and a data bus. The computer-readable storage medium included in the controller is programmable with computer readable data representing instructions executable by the processor for performing the control routines and methods described below as well as other variants that are not specifically listed.

Each fuel injector of the plurality of fuel injectors includes a first needle 366, a second needle 368, a first control volume 364, a second control volume 362, and a fuel passage 360. The second needle partially surrounds the first needle and separates the first control volume and the second control volume from the fuel passage. Fuel may flow from the common fuel rail into the fuel passage via a first inlet passage 354. Fuel may flow from the common fuel rail into the first control volume and second control volume via a second inlet passage 356. The second inlet passage may be coupled with an orifice 352 configured to reduce a fuel flow rate through the second inlet passage relative to a fuel flow rate through the first inlet passage. By reducing the fuel flow rate through the second inlet passage relative to the fuel flow rate through the first inlet passage, a fuel pressure within the fuel passage may increase at a faster rate than a fuel pressure within the first control volume and second control volume.

Fuel may flow out of the first control volume and second control volume via an outlet passage 358. In one example, the outlet passage may be coupled with a return conduit 340 configured to flow fuel from the fuel injectors toward the fuel tank. In some examples, a pressure of fuel vapor within the fuel tank may be approximately a same pressure as atmospheric pressure (e.g., a pressure of air surrounding an exterior of the fuel tank). The outlet passage is coupled with a valve 350 (e.g., a solenoid valve such as an electromagnetic solenoid). In one example, the valve (which may herein be referred to as a needle actuator) may be energized by a power source (e.g., the alternator/generator shown by FIG. 1, a battery, or the like) in response to a signal (e.g., electrical signal) transmitted from the controller to the needle actuator in order to flow fuel from the first control volume and second control volume into the outlet passage. In other examples, the needle actuator may be mechanically driven by a torque output of the engine in order to flow fuel from the fuel injector through the outlet passage. In one example, one or more of the first inlet passage, second inlet passage, orifice, and outlet passage may be included within a body (e.g., a housing) of the fuel injector, with the fuel injector receiving fuel via the common fuel rail.

Examples of fuel injectors which may be included within a fuel system similar to the fuel system shown by FIG. 3 are described below with reference to FIGS. 4-7. The embodiments of the fuel injectors shown by FIGS. 4-7 may include components similar to each other. Similar components may be labeled similarly and not re-introduced once introduced.

FIG. 4 shows a first embodiment of a fuel injector 400 (e.g., similar to the fuel injectors shown by FIG. 3 and described above). The fuel injector shown by FIG. 4 includes a nozzle 402 having a nozzle body 404. The nozzle body includes a first fuel inlet 474, a second fuel inlet 478, and a fuel outlet 480 (e.g., similar to the first fuel inlet, second fuel inlet, and fuel outlet described above with reference to FIG. 3). The second fuel inlet and the fuel outlet are fluidly coupled with a chamber 456 formed by a chamber sidewall 461. The chamber sidewall extends away from a top surface 476 (e.g., top sidewall) of the nozzle toward a nozzle tip 406 in a direction of a central vertical axis 490 of the nozzle.

A first needle 410 and a second needle 412 (e.g., similar to the first needle and second needle described above with reference to FIG. 3) are included within the nozzle body. The second needle surrounds a portion of the first needle, and the first needle and second needle are movable relative to each other in the direction of the central vertical axis of the nozzle. A portion of the second needle is shaped to fit within the chamber and has a diameter 484 slightly smaller than a diameter of an inner surface 460 of the chamber sidewall. A fuel passage 440 (e.g., similar to the fuel passage described above with reference to FIG. 3) is formed by an exterior surface 442 of the second needle, an inner surface 441 of the nozzle body, and an outer surface 462 of the chamber sidewall (e.g., a surface of the chamber sidewall positioned a larger amount of distance away from the vertical central axis of the fuel injector than a distance between the vertical central axis and the inner surface of the chamber sidewall). Fuel flows into the fuel passage via the first fuel inlet and surrounds the exterior surface of the second needle.

A first control volume 448 is formed by inner walls 444 of the second needle and is fluidly separated from the fuel passage surrounding the exterior of the second needle by a top surface 446 of the first needle. A second control volume 458 is formed by the inner surface of the chamber sidewall, the top surface of the nozzle, and a top surface 464 of the second needle. The first control volume and second control volume are fluidly coupled to one another via a passage 452 in the top surface of the second needle. Fluid (e.g., fuel) may flow from the first control volume to the second control volume and from the second control volume to the first control volume.

In one example, fuel may flow into the second control volume and the first control volume via the second fuel inlet in response to a fuel pressure within a fuel rail fluidly coupled with the second fuel inlet (e.g., the fuel rail described above with reference to FIG. 3) exceeding a fuel pressure of fuel within the second control volume and/or the first control volume. A needle actuator may be energized by a controller (e.g., the needle actuator and controller described above with reference to FIG. 3) in order to increase an amount of opening of the needle actuator and to flow fuel from the second control volume through a fluid passage (e.g., the outlet passage described above with reference to FIG. 3) coupled with the fuel outlet. The first control volume and second control volume are fluidly coupled to each other and fuel within the first control volume may mix with fuel within the second control volume. In one example, energizing the needle actuator for a first duration to flow fuel out of the second control volume and into the fluid passage may result in an increased flow of fuel from the first control volume into the second control volume. However, in other examples, energizing the needle actuator for a second duration (e.g., a shorter amount of time than the first duration) may result in fuel flowing from the second control volume into the fluid passage and may not result in an increased flow of fuel from the first control volume into the second control volume. For example, the second duration may be a relatively small amount of time (e.g., relative to the first duration) so that fuel flows from the second control volume and into the fluid passage, and as the fuel flows out of the second control volume the fuel is continuously replaced with fuel flowing into the second control volume via the second fuel inlet. In this way, a flow of fuel from the first control volume into the second control volume is not increased and a fuel pressure within the first control volume may not be reduced. Examples of fuel flow through the first control volume and second control volume are discussed in further detail below with respect to relative movement of the first needle and the second needle responsive to energization of the needle actuator.

The first needle and the second needle are each biased in a direction toward the nozzle tip by separate biasing members. The first needle is coupled with a first biasing member 450 extending between the top surface 446 of the first needle and the top surface 476 of the nozzle. The first biasing member biases a tip 425 of the first needle against a sidewall 438 of the nozzle tip. The first needle is biased against the sidewall (e.g., is pressed into face-sharing contact with the sidewall) at a location 426 upstream of a first plurality of injection holes 414 (which may be referred to herein as main injection holes) relative to a direction of fuel flow from the first fuel inlet through the fuel passage and toward the nozzle tip. The second needle is coupled with a second biasing member 454 extending between the top surface 464 of the second needle and the top surface 476 of the nozzle. The first biasing member has a first diameter 482 (e.g., a length in a direction perpendicular to the central vertical axis of the fuel injector) and the second biasing member has a second diameter 485. The second diameter is larger than the first diameter such that a portion of the first biasing member is surrounded by (e.g., fits within an inner perimeter of) the second biasing member. In some examples, the first biasing member and the second biasing member may apply an approximately same amount of biasing force against the first needle and the second needle (respectively). In other examples, a biasing force of the first biasing member against the first needle may be a different amount of force (e.g., may have a different magnitude) than a biasing force of the second biasing member against the second needle. In one example, at least one of the first biasing member and second biasing member may be a spring.

The nozzle tip includes a first end 416 and a second end 408. The first end has a first width 418 and the second end has a second width 428, with the first width being less than the second width. The first end is positioned a greater amount of distance from the top surface of the nozzle than a distance of the second end from the top surface of the nozzle. In other words, the nozzle tip tapers (e.g., narrows) in a direction away from the top surface of the nozzle. The first end of the nozzle tip includes the main injection holes (referred to above as the first plurality of injection holes) and the second end includes a second plurality of injection holes 420 (which may be referred to herein as pilot injection holes). Each of the pilot injection holes has an inner diameter that is smaller than an inner diameter of each main injection hole. By configuring the pilot injection holes to have a smaller inner diameter relative to the main injection holes, a fuel flow rate from the pilot injection holes may be decreased relative to a fuel flow rate from the main injection holes when fuel flows out of the fuel injector from each of the pilot injection holes and main injection holes. Examples of fuel flow from the fuel injector are described further below.

The pilot injection holes are passages extending through the sidewall of the nozzle tip from an interior of the fuel injector to an exterior of the fuel injector. Each of the pilot injection holes is fluidly coupled with the fuel passage within the fuel injector (e.g., the fuel passage surrounding the second needle) such that fuel may flow from the fuel passage out of the nozzle tip via the pilot injection holes. The main injection holes are also fluidly coupled with the fuel passage such that fuel may flow from the fuel passage out of the nozzle tip via the main injection holes. However, a flow rate of fuel from the pilot injection holes (or a flow rate of fuel from the pilot injection holes and the main injection holes) is responsive to a position of the first needle and the second needle relative to the body of the nozzle. Energization of the needle actuator may flow fuel out of the second control volume (or a combination of the second control volume and the first control volume) in order to adjust a position of the first needle and second needle relative to each other, as described further below with reference to FIG. 8. When the needle actuator is not energized, the first needle is normally biased against the sidewall of the nozzle tip by the first biasing member and the second needle is normally biased against the sidewall of the nozzle tip by the second biasing member as described above. The pilot injection holes are positioned along the sidewall between the location at which the first needle is in face-sharing contact with the sidewall and a location 424 at which the second needle is in face-sharing contact with the sidewall. In other words, the pilot injection holes are positioned upstream relative to the location where the first needle presses against the sidewall and downstream relative to the location where the second needle presses against the sidewall. The main injection holes are positioned downstream relative to the pilot injection holes. Pressing the second needle against the sidewall (e.g., via the biasing force of the second biasing member against the second needle) does not allow fuel to flow from the fuel passage to locations downstream of the fuel passage (e.g., the pilot injection holes and the main injection holes). Pressing the first needle against the sidewall (e.g., via the biasing force of the first biasing member against the first needle) does not allow fuel to flow from the fuel passage to the main injection holes.

In this configuration, while the first needle is pressed against the sidewall and the second needle is not pressed against the sidewall, fuel may flow from the fuel passage through the pilot injection holes but not through the main injection holes. Additionally, while both of the first needle and second needle are not pressed against the sidewall, fuel may flow from the fuel passage to each of the pilot injection holes and the main injection holes. In order to not press the first needle and/or the second needle against the sidewall (e.g., in order to move the first needle and/or second needle in a direction away from the sidewall), fuel may be removed from the second control volume (or both of the first control volume and the second control volume) via energization of the needle actuator. The removal of the fuel results in forces against the first needle and/or the second needle in a direction opposite to the direction of the biasing forces of the first biasing member and/or second biasing member against the needles.

Fuel pressure within the second control volume results in a force against the top surface of the second needle in the direction of the nozzle tip (e.g., in the direction of the biasing force of the second biasing member against the second needle). However, fuel pressure within the fuel passage surrounding the second needle results in an opposing force against a first protrusion 466 of the second needle in a direction opposite to the biasing force of the second biasing member against the second needle and opposite to the force due to the fuel pressure within the second control volume (e.g., in a direction toward the top surface of the nozzle). During conditions in which the needle actuator is not energized (e.g., conditions in which fuel is not flowing out of the second control volume via the fuel outlet), a combined force against the second needle in the direction of the nozzle tip due to the fuel pressure within the second control volume and the second biasing member is greater than the opposing force against the first protrusion of the second needle from the fuel pressure within the fuel passage. As fuel flows out of the second control volume, the opposing force toward the top surface of the nozzle may exceed the combined force toward the nozzle tip and the second needle may move away from the nozzle tip toward the top surface of the nozzle (e.g., into the chamber). Fuel within the fuel passage may then flow downstream of the second needle and through the pilot injection holes. In one example, the first protrusion is formed by a first surface 468 extending away from the exterior surface of the second needle in a direction perpendicular to the central vertical axis, and the first surface is joined with a second surface 470 extending at a first angle 472 relative to the first surface. A magnitude of the opposing force against the first protrusion and toward the top surface of the nozzle is a result of a size and angle of the second surface relative to the first surface. In other examples, the first surface and second surface may be sized and/or angled differently relative to each other compared to the configuration shown by FIG. 4.

The first needle also includes a second protrusion 432 formed by a third surface 434 extending away from the first needle in a direction perpendicular to the central vertical axis. The third surface is joined with a fourth surface 436 extending at a second angle 430 relative to the third surface. While the second needle is pressed against the sidewall of the nozzle tip, a bottom surface 422 of the second needle is in face-sharing contact with the third surface of the second protrusion. The pressing of the second needle against the sidewall of the nozzle tip by the second biasing member therefore prevents the first needle from moving away from the nozzle tip while the second needle is pressed against the nozzle tip. However, while the second needle is moved away from the nozzle tip as described above, the first needle is no longer prevented by the second needle from moving toward the top surface of the nozzle. The fuel pressure within the fuel passage applies a force (which may be referred to herein as an upward force) on the second protrusion (and therefore, the first needle) in the direction of the top surface of the nozzle. The first biasing member and a fuel pressure within the first control volume each apply forces (which may be referred to herein as downward forces) to the first needle in the direction of the nozzle tip. If the upward force exceeds the downward forces, the first needle moves in the direction toward the top surface of the nozzle and fuel flows through the fuel passage downstream of the first needle and through the main injection holes. Flowing fuel out of the first control volume (e.g., via energization of the needle actuator as described above) reduces the fuel pressure within the first control volume and thereby reduces a magnitude of the downward forces against the first needle. In this way, by flowing fuel out of the first control volume, the first needle may move away from the nozzle tip in order to flow fuel through the main injection holes. Example fuel flows through a fuel injector similar to those shown by FIGS. 4-7 and described herein are described further below with reference to FIG. 8.

FIG. 5 shows a second embodiment of a fuel injector 500. The fuel injector shown by FIG. 5 includes components similar to those shown by the fuel injector of FIG. 4. For example, the fuel injector includes a nozzle 502, a nozzle body 504, a nozzle tip 546, first needle 410, and a second needle 538. The nozzle body includes a first control volume 532 formed by an inner wall 528 of the second needle, the top surface of the first needle, and a central wall 549 of the second needle extending in a direction perpendicular to the inner wall and parallel to the top surface of the first needle. The first control volume is fluidly coupled to a second control volume 510 (formed by the chamber and a top surface 514 of the second needle) via a passage 548 extending between the first control volume and second control volume. A first biasing member 524 is positioned within the first control volume and a second biasing member 512 is positioned within the second control volume. The first biasing member extends between the top surface of the first needle and the central wall of the second needle, and the second biasing member extends between the top surface of the second needle and the top surface of the nozzle.

In the example shown by FIG. 5, the passage fluidly coupling the first control volume to the second control volume has a smaller diameter than the passage coupling the control volumes shown by FIG. 4. Additionally, an entirety of the passage shown by FIG. 5 is positioned a distance 525 away from the central vertical axis of the fuel injector in a radial direction relative to the central vertical axis. The passage is sized and positioned such that the first biasing member and second biasing member do not extend into the passage. The first biasing member is positioned only within the first control volume, and the second biasing member is positioned only within the second control volume.

The first control volume is fluidly coupled with a fuel passage 536 (similar to the fuel passage described above with reference to FIG. 4) surrounding the second needle via a bleed passage 534. The bleed passage extends in a radial direction relative to the central vertical axis through the second needle. In one example, the bleed passage increases an ability of fuel within the first control volume to flow through the passage extending between the first control volume and second control volume. The smaller diameter of the passage extending between the first control volume and the second control volume decreases a flow rate of fuel from the first control volume to the second control volume in response to energization of a needle actuator of the fuel injector (e.g., the needle actuator described above with reference to FIG. 4). In this embodiment, a fuel pressure within the first control volume shown by FIG. 5 may be increased relative to a fuel pressure within the first control volume in the embodiment shown by FIG. 4. As a result of the increased fuel pressure within the first control volume, an amount of movement of the first needle in a direction away from the nozzle tip may be reduced. The increased fuel pressure of the first control volume increases a magnitude of downward forces against the first needle (as described above with reference to FIG. 4). An energization duration of the needle actuator to move the first needle toward the top surface of the nozzle is thereby increased relative to the example described above with reference to FIG. 4. In this way, energizing the needle actuator may result in a fuel flow from the pilot injection holes for an increased amount of time relative to a fuel flow from both of the pilot injection holes and the main injection holes. Examples of fuel flow from the pilot injection holes and main injection holes are described further below with reference to FIGS. 8-13.

FIG. 6 shows a third embodiment of a fuel injector 600. The fuel injector shown by FIG. 6 includes various components similar to those shown by FIGS. 4-5 and described above. The fuel injector includes a nozzle 602, a nozzle body 604, and a nozzle tip 646. The first needle and second needle are positioned within the nozzle with the second needle surrounding a portion of the first needle as described above with reference to FIGS. 4-5.

The nozzle includes a floating element 680 extending from a top surface 606 of the nozzle toward the nozzle tip. The floating element includes a top surface 649 extending in a direction perpendicular to the central vertical axis and parallel to a top surface 614 of the second needle. The top surface of the second needle includes a flow passage 648 fluidly coupling a first control volume 632 positioned within the second needle and a second control volume 610 positioned above the second needle (e.g., toward the top surface of the nozzle) in the direction of the central vertical axis. The second control volume is formed by the top surface of the floating element, the top surface of the nozzle, the top surface of the second needle, and the inner wall of the chamber of the nozzle (e.g., the chamber formed by the chamber sidewall extending away from the top surface of the nozzle and toward the nozzle tip). The first control volume is formed by an inner surface 628 of the second needle, the top surface of the first needle, a first bottom surface 665 of the floating element, a second bottom surface 663 of the floating element, and a side surface 661 of the floating element extending between the first bottom surface and second bottom surface. The first control volume is fluidly coupled with the second control volume via the flow passage positioned within the floating element. The flow passage extends between the top surface and the first bottom surface of the floating element in the direction of the central vertical axis and is positioned away from the central vertical axis in a first radial direction relative to the central vertical axis. Fuel from the first control volume and the second control volume may mix and converge by flowing through the flow passage of the floating element.

A first biasing element 624 is positioned within the first control volume and biases the first needle against the nozzle tip. The first biasing element extends between the first bottom surface of the floating element and the top surface of the first needle. In one example, the first biasing element is a spring positioned away from the central vertical axis and the flow passage in a second radial direction relative to the central vertical axis, with the second radial direction being opposite to the first radial direction. The first biasing element is positioned entirely within the first control volume such that no portion of the first biasing element is positioned within the second control volume.

A second biasing element 612 is positioned within the second control volume and extends from the top surface of the second needle to the top surface of the nozzle. The second biasing element is positioned entirely within the second control volume such that no portion of the second biasing element is positioned within the first control volume. In one example, the second biasing element is a spring surrounding a portion of the floating element. The second biasing element biases the second needle toward the nozzle tip.

By configuring the fuel injector to include the floating element as described above with reference to FIG. 6, a mass of the second needle may be reduced relative to the second needle described above with reference to FIG. 5. In some examples, the reduced mass of the second needle may result in a faster movement of the second needle in response to increases or decreases of the fuel pressure within the second control volume. Additionally, because the first biasing member is in face-sharing contact with the first bottom surface of the floating element and is not coupled with the second needle, the first biasing member does not expand or contract in response to a movement of the second needle. Coupling the first biasing member with the first bottom surface of the floating element may enable the first biasing member to be configured with an increased variety of spring constants, material types, and the like in order to adjust the movement of the first needle responsive to fuel pressure within the fuel passage.

FIG. 7 shows a fourth embodiment of a fuel injector 700. The fuel injector shown by FIG. 7 includes several components similar to those shown by FIG. 6. The fuel injector includes a nozzle 702, a nozzle body 704, and a nozzle tip 746. However, the fuel injector shown by FIG. 7 does not include the plurality of pilot injection holes described above and shown by FIGS. 4-6. Instead, an injection passage 750 routed through the sidewall of the nozzle tip is fluidly coupled with the fuel passage (e.g., the fuel passage surrounding the second needle) at a location upstream of the first needle and downstream of the second needle relative to a flow of fuel through the fuel passage. Energizing a needle actuator (e.g., as described above with reference to the examples shown by FIGS. 4-6) coupled with the fuel injector in order to move the second needle away from the nozzle tip increases a flow rate of fuel through the fuel passage and downstream of the location at which the second needle presses against the sidewall of the nozzle. The fuel may then flow through the injection passage and out of the nozzle tip.

Configuring the fuel injector to flow fuel through the injection passage during energization of the needle actuator (e.g., during a movement of the second needle away from the nozzle tip) may decrease a total number of injection holes included by the nozzle. In one example, the needle actuator may be energized for a first duration in order to flow fuel from only the injection passage and to not flow fuel from the main injection holes. In another example, the needle actuator may be energized for a second duration longer than the first duration in order to flow fuel from both of the injection passage and the main injection holes. By positioning an outlet 751 of the injection passage at the nozzle tip along with the main injection holes, a flow rate of fuel from the injection passage may be approximately the same as a flow rate from each main injection hole during energization of the needle actuator for the second duration. As a result, an evenness of fuel jets spraying from the nozzle tip may be increased. Additionally, flowing fuel through the injection passage and not through the main injection holes may increase a precision of a fuel flow amount sprayed from the nozzle tip, and the increased precision may increase engine performance (e.g., by precisely controlling an air/fuel ratio within an engine cylinder coupled with the fuel injector).

FIG. 8 shows an example method 800 for flowing fuel through a fuel injector including a nozzle, a nozzle tip, a first needle (which may be referred to herein as an inner needle), a second needle (which may be referred to herein as an outer needle), a first set of holes, and a second set of holes, similar to the fuel injectors described above with reference to FIGS. 4-7. In one example, the first set of holes may be the pilot injection holes as described above, the second set of holes may be the main injection holes as described above, and the second needle may surround a portion of the first needle as described above. The fuel injector is coupled with a needle actuator (e.g., similar to the needle actuators described above). The needle actuator may be energized in order to flow fuel through the fuel injector and into a cylinder (e.g., combustion chamber) of an engine. Instructions for carrying out method 800 and the rest of the methods included herein may be executed by a controller (e.g., the controllers shown by FIGS. 1-3 and described above) based on instructions stored on a memory of the controller and in conjunction with signals received from sensors of the engine system, such as the sensors described above with reference to FIGS. 1-3. The controller may employ engine actuators of the engine system to adjust engine operation, according to the methods described below. An example fuel injector is described below with reference to the method shown by FIG. 8. However, the method may be performed for each fuel injector of the engine. In some examples, each fuel injector may be adjusted independently of each other fuel injector. In other examples, one or more fuel injectors may be adjusted in unison.

At 802 the method includes estimating and/or measuring engine operating conditions. In one example, engine operating conditions may include engine torque output, engine load, fuel injection amount, fuel temperature, fuel rail pressure, needle actuator energization amount and/or duration, and the like. In one example, the controller may measure a fuel injection amount by comparing a width of an electrical pulse transmitted from the controller to the needle actuator to a look-up table stored in non-transitory memory of the controller, with the input being electrical pulse width and the output being fuel injection amount (e.g., an amount of fuel delivered to engine cylinders from one or more fuel injectors).

As another example, the controller may make a logical determination (e.g., regarding a fuel injection amount) based on logic rules that are a function of the width of electrical pulses transmitted to the needle actuator. The controller may then generate a control signal that is sent to the needle actuator.

The method continues to 804 where the method includes determining whether the engine is operating. In one example, determining whether the engine is operating (e.g., on, and combusting fuel) may include comparing a measured and/or estimated engine speed, load, temperature, fuel injection amount, and the like to threshold values. For example, if the measured and/or estimated engine speed is above a threshold engine speed, the controller may determine that the engine is operating.

If the engine is operating at 804, the method continues to 806 where the method includes determining whether a desired liquid fuel injection amount is less than a threshold amount. In one example, the threshold amount may be based on a pre-determined amount of liquid fuel injection and the desired liquid fuel injection amount may be based on a selected operating mode of the engine (e.g., selected by the controller or an operator of the engine). For example, the engine may be a dual-fuel engine (e.g., similar to the example shown by FIG. 2), and a first operating mode of the engine may be a mode in which the cylinders of the engine combust a large amount of gaseous fuel (e.g., hydrogen) from a gaseous fuel system and a relatively small amount of liquid fuel (e.g., diesel) from a liquid fuel system. In one example, the threshold amount of liquid fuel may correspond to an amount at which a mass ratio of the injected liquid fuel to the injected gaseous fuel is 1:100. In other examples the mass ratio may be a different ratio, such as 1:20. The controller may compare an amount of fuel injected by fuel injectors for the selected operating mode to the threshold amount.

In yet further examples, the desired liquid fuel injection amount may be passively based on relative fuel pressures and/or amounts of fuel stored within each respective fuel system. For example, during conditions in which a relatively large amount of gaseous fuel is stored within the gaseous fuel system and a relatively small amount of liquid fuel is stored within the liquid fuel system, one or more valves of the engine system may be passively opened or closed (e.g., automatically and without communication from the controller) in order to increase an injection of gaseous fuel to engine cylinders and to decrease an injection of liquid fuel to engine cylinders, and the amount of injected liquid fuel may be referred to herein as the desired amount. In one example, a ratio of the amount (e.g., mass) of liquid fuel injected into engine cylinders relative to the amount of gaseous fuel injected into engine cylinders may be 1:30 (e.g., due to the passive opening or closing of one or more valves as described above), and the threshold amount of liquid fuel may correspond to an amount at which a mass ratio of the injected liquid fuel to the injected gaseous fuel is 1:20. Because the desired amount of injected liquid fuel is less than the threshold amount, the method then continues to 808. In another example, the ratio of the amount of liquid fuel injected into engine cylinders relative to the amount of gaseous fuel injected into engine cylinders may be 1:10, and the threshold amount of liquid fuel may correspond to an amount at which a mass ratio of the injected liquid fuel to the injected gaseous fuel is 1:20. Because the desired amount of injected liquid fuel is greater than the threshold amount, the method then continues to 810.

If the desired liquid fuel injection amount is less than the threshold amount at 806, the method continues to 808 where the method includes energizing the needle actuator of the fuel injector for a first duration. In one example, the first duration may be a pre-determined amount of time based on a specific shape and/or actuation time of the first needle and second needle within the nozzle of the fuel injector. For example, while the needle actuator of the fuel injector is energized, fuel may flow out of the second control volume of the fuel injector (e.g., the second control volumes described above with reference to the embodiments shown by FIGS. 4-7) thereby reducing a fuel pressure within the second control volume. The amount of time of the first duration may be an amount of time to remove a pre-determined amount of fuel from the second control volume.

The method continues to 809 where the method includes during the first duration, moving the outer needle of the fuel injector away from a sidewall of the nozzle tip to inject fuel only from a first set of holes. In one example, the first set of holes may be the pilot injection holes described above with reference to FIGS. 4-7, and the outer needle moved during the first duration is the second needle (e.g., the second needle surrounding the first needle). In this example, the first duration is an amount of energization time at which a sufficient amount of fuel is removed from the second control volume in order to decrease the fuel pressure within the control volume and move the second needle toward a top surface of the nozzle and away from the nozzle tip. However, the first duration is not a sufficient amount of time to remove enough fuel from the first control volume to reduce the fuel pressure within the first control volume and to move the first needle away from the nozzle tip. As a result, only the second needle is moved away from the nozzle tip, and fuel is injected into the engine cylinders from only the pilot injection holes. The first duration may additionally be based on the desired amount of liquid fuel injection. For example, the needle actuator may be energized for the first duration in order to inject the desired liquid fuel amount (e.g., corresponding to a liquid:gas fuel ratio of 1:100 as described above) from only the pilot injection holes. In this way, a relatively small amount of fuel may be injected into the cylinders via the first set of holes.

The method then continues to 816 where the method includes de-energizing the needle actuator. The needle actuator is de-energized after the first duration during a single injection cycle in order to move the second needle toward the nozzle tip and to reduce the amount of fuel flowing through the first set of holes. As described above with reference to the examples shown by FIGS. 4-7, the second needle may be biased toward the nozzle tip by a biasing member (e.g., a spring). While the needle actuator is de-energized, fuel flows into the second control volume and the second needle is urged against the sidewall of the nozzle tip by the biasing member and the fuel pressure of fuel within the second control volume.

If the desired liquid fuel injection amount is greater than the threshold amount at 806, the method continues to 810 where the method includes energizing the needle actuator for a second duration. In one example, the second duration may be a longer duration than the first duration (described above at 808).

The method continues to 812 where the method includes during the second duration, first moving the outer needle of the fuel injector away from the sidewall of the nozzle tip to inject fuel from the first set of holes. The outer needle moved at 812 may be the second needle as described above (e.g., the second needle surrounding the first needle). Energization of the needle actuator flows fuel out of the second control volume and upward forces against the second needle (e.g., due to fuel pressure of fuel surrounding the second needle within a fuel passage, as described above with reference to FIGS. 4-7) move the second needle away from the nozzle tip. Fuel may then flow downstream of the second needle through the first set of holes (e.g., the pilot injection holes).

The method then continues to 814 where the method includes during the second duration and after moving the outer needle, moving the inner needle of the fuel injector away from the sidewall of the nozzle tip to inject fuel from the first set of holes and a second set of holes. For example, the needle actuator may be energized for the second duration to remove fuel from both of the first control volume and the second control volume, thereby reducing a fuel pressure within the first control volume and second control volume. As a result, the inner needle (e.g., the first needle surrounded by the second needle as described above) also moves away from the nozzle tip and fuel flows downstream through both the first set of holes and the second set of holes (e.g., the pilot injection holes and the main injection holes, respectively). A length of the second duration may be an amount of time based on the desired amount of liquid fuel injection. For example, the needle actuator may be energized in order to move both of the first needle and second needle away from the nozzle tip and to inject a specific amount of fuel into cylinders of the engine (e.g., an amount corresponding to a desired liquid/gaseous fuel ratio of 1:1, for example, or an injection amount sufficient for combustion of only liquid fuel during conditions in which no gaseous fuel is injected).

The method then continues to 816 where the method includes de-energizing the needle actuator. While the needle actuator is de-energized, fuel flows into the second control volume and increases the fuel pressure within the second control volume. The increased fuel pressure causes the second needle to move toward the nozzle tip and to press against the sidewall of the nozzle tip, thereby decreasing a flow of fuel to the first set of holes and second set of holes. As the second needle is urged toward the nozzle tip, the second needle presses against the first needle so that the first needle and second needle are pressed against the sidewall at approximately the same time.

FIGS. 9-10 show an example flow rate of fuel from a fuel injector in response to energization of a needle actuator coupled to the fuel injector for a first duration (e.g., such as the fuel injectors, needle actuators, and first duration described above with reference to FIGS. 4-8). FIGS. 11-12 shown an example flow rate of fuel from the fuel injector in response to energization of the needle actuator for a second duration (e.g., a duration longer than the first duration as described above). FIG. 13 illustrates relative fuel pressures within the fuel injector at different times during the second duration. Although the example fuel injector shown by FIG. 10 and FIG. 12 is a same fuel injector as that shown by FIG. 6 and described above, the energization times and flow rate shown by FIG. 9 and FIG. 11 may be representative of operation of any of the fuel injectors described herein (e.g., such as those shown by FIGS. 4-5 and FIG. 7).

Turning first to FIGS. 9-10, a plot 900 is shown by FIG. 9. The plot includes a needle actuator energization amount 902 and a fuel flow rate 904. FIG. 10 shows the fuel injector in a first view 1000 and a second view 1002. The first view may correspond to a condition of the fuel injector between times t0 and t2 on the plot shown by FIG. 9.

Between times t0 and t1, the needle actuator energization amount is low and fuel does not flow from the nozzle of the fuel injector to cylinders of an engine. The second needle is in a first position 1004 as shown by the first view of FIG. 10. The first needle and the second needle of the fuel injector are pressed against the sidewall of the nozzle tip, thereby preventing fuel from flowing out of the pilot injection holes and the main injection holes.

Between times t1 and t2, needle actuator energization amount increases. As a result, fuel begins to flow out of the second control volume via the fuel outlet and a fuel pressure within the second control volume begins to decrease. At time t2, the fuel pressure within the second control volume decreases below a first threshold fuel pressure and the second needle moves in the direction away from the nozzle tip. The fuel flow rate increases as fuel flows downstream of the second needle and through the pilot injection holes between times t2 and t3. In this condition, the second needle is in a second position 1006 shown by the second view of FIG. 10. Fuel jets 1008 spray from the pilot injection holes. However, fuel does not flow through the main injection holes because a fuel pressure within the first control volume has not yet decreased below a second threshold fuel pressure. As a result, the first needle does not move away from the sidewall of the nozzle tip.

At time t3 the needle actuator energization amount is decreased to the amount that is was between times t0 and t1. The fuel injector continues to flow fuel through the pilot injection holes while the fuel pressure within the second control volume begins to increase. At time t4, the fuel pressure within the second control volume increases above the first threshold fuel pressure and the second needle moves in the direction toward the nozzle tip. As the second needle moves toward the nozzle tip between times t4 and t5, the fuel flow rate through the pilot injection holes decreases. At time t5 the second needle is pressed fully against the sidewall of the nozzle tip and fuel does not flow from the pilot injection holes.

By energizing the needle actuator coupled to the fuel injector for the first duration as described above with reference to FIGS. 9-10, fuel may be injected from only the pilot injection holes of the nozzle.

FIGS. 11-12 show examples of the fuel injector energized for the second duration. Plot 1100 shown by FIG. 11 includes a needle actuator energization amount 1102 and a fuel flow rate 1104. FIG. 12 shows the fuel injector in a third view 1200, a fourth view 1202, and a fifth view 1204. The third view may correspond to a condition of the fuel injector between times t0 and t2 on the plot shown by FIG. 12.

Various fuel pressures are shown by FIG. 12 at different locations within the fuel injector. For example, P1 indicates a fuel pressure within the second control volume, P2 indicates a fuel pressure within the first control volume, P3 indicates a fuel pressure at a location upstream of the first needle and downstream of the second needle within the fuel passage, and P4 indicates a fuel pressure within the fuel passage surrounding the second needle. Each of the fuel pressures (e.g., P1, P2, P3, and P4) are shown by plot 1300 of FIG. 13 alongside the needle actuator energization amount and the fuel flow rate described above with reference to FIGS. 11-12. The first threshold fuel pressure is indicated by 1302 and the second threshold fuel pressure is indicated by 1304.

Between times t0 and t1, the needle actuator energization amount is low and fuel does not flow from the nozzle of the fuel injector to cylinders of an engine. The second needle is in the first position as shown by the third view of FIG. 10. The first needle and the second needle of the fuel injector are pressed against the sidewall of the nozzle tip, thereby preventing fuel from flowing out of the pilot injection holes and the main injection holes.

Between times t1 and t2, the needle actuator energization amount increases. As a result, fuel begins to flow out of the second control volume via the fuel outlet and a fuel pressure within the second control volume begins to decrease. At time t2, the fuel pressure within the second control volume decreases below the first threshold fuel pressure and the second needle moves in the direction away from the nozzle tip. The fuel flow rate increases as fuel flows downstream of the second needle and through the pilot injection holes between times t2 and t3. In this condition, the second needle is in the second position shown by the fourth view of FIG. 12. Fuel jets spray from the pilot injection holes. However, fuel does not flow through the main injection holes because the fuel pressure within the first control volume has not yet decreased below the second threshold fuel pressure. As a result, the first needle does not move away from the sidewall of the nozzle tip.

At time t3, the fuel pressure within the first control volume decreases below the second threshold fuel pressure due to fuel flowing from the first control volume to the second control volume and into the fuel outlet. As a result, the first needle moves away from the sidewall of the nozzle tip and the fuel flow rate from the nozzle increases as fuel flows out of the main injection holes. Between time t3 and t4 the fuel flow rate increases until the first needle moves to a retracted position 1210 shown by the fifth view. Pilot injection jets 1212 spray from the pilot injection holes and main injection jets 1214 spray from the main injection holes. In one example, the pilot injection jets shown in the fifth view may have an increased or decreased fuel flow rate relative to the fuel jets shown by the fourth view.

Between times t4 and t5 the fuel flow rate decreases slightly due to a decreased fuel pressure within the fuel passage surrounding the second needle and the fuel flowing from the nozzle via the pilot injection holes and the main injection holes. At time t5, the needle actuator energization amount decreases to the amount that it was at time t0. Fuel continues to flow from the pilot injection holes and the main injection holes as fuel pressure within the first control volume and second control volume begins to increase. At time t6, the fuel pressure within the second control volume increases above the first threshold fuel pressure and the second needle moves in the direction toward the nozzle tip. As the second needle moves toward the nozzle tip, the second needle presses against the first needle and urges the first needle toward the nozzle tip. In this way the first needle and the second needle move together toward the nozzle tip at approximately a same rate, and the fuel flow rate decreases gradually between times t6 and t7. At time t7 both of the first needle and the second needle are fully pressed against the sidewall of the nozzle tip and fuel no longer flows from the pilot injection holes or the main injection holes. By flowing fuel through the fuel injector for the second duration as described above, an increased amount of liquid fuel may be injected into engine cylinders via the main injection holes.

By configuring the fuel injector according to the examples described above, the needle actuator may be energized for different amounts of time in order to adjust an amount of fuel flowing from the fuel injector. The technical effect of energizing the needle actuator for a first amount of time (e.g., the first duration) is to flow fuel only from the first set of holes of the nozzle of the fuel injector. The technical effect of energizing the needle actuator for a second amount of time (e.g., the second duration) is to flow fuel from both of the first set of holes and the second set of holes (e.g., the pilot injection holes and the main injection holes, respectively). The first set of holes may be configured with a smaller diameter relative to the second set of holes so that fuel flowing from the first set of holes flows at a decreased rate relative to fuel flowing from the second set of holes. A smaller amount of fuel may be delivered to cylinders of the engine when the needle is energized for the first amount of time relative to the second amount of time (e.g., when fuel flows only from the first set of holes and not from the second set of holes). Flowing the smaller amount of fuel from only the first set of holes may increase an atomization of fuel spraying into engine cylinders from the first set of holes and may decrease a droplet size of fuel spraying into the engine cylinders. In this way, a mixing of air/gaseous fuel and liquid fuel may be increased, resulting in an increase in combustion efficiency and engine performance.

FIGS. 4-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As one embodiment, a fuel injector comprises: a nozzle tip including a plurality of injection holes; a first needle biased against the nozzle tip via a first biasing member positioned within a first control volume; and a second needle surrounding a portion of the first needle and biased against the first needle and the nozzle tip via a second biasing member positioned within a second control volume. The fuel injector may further comprise a fuel passage positioned around the second needle and separated from the first control volume and second control volume via outer walls of the first needle, the second needle, and chamber walls of a chamber containing the second control volume. In one example, the plurality of injection holes includes a first plurality of injection holes positioned at a narrower, first end of the nozzle tip and at least one second injection hole positioned at a wider, second end of the nozzle tip, and the second end of the nozzle tip is positioned closer to where the nozzle tip couples to a body of a nozzle of the fuel injector than the first end of the nozzle tip, the body of the nozzle including the first control volume and second control volume. In another example, the at least one second injection hole is positioned in a sidewall of the nozzle tip, between where the first needle and second needle contact the sidewall of the nozzle tip when the first needle and second needle are biased against the nozzle tip and the first plurality of injection holes are positioned downstream in the nozzle tip from where the first needle contacts the sidewall of the nozzle tip when the first needle is biased against the nozzle tip. In yet another example, the plurality of injection holes are positioned around a circumference of a narrower, first end of the nozzle tip, where a first portion of the plurality of injection holes are in fluid communication with the fuel passage at the narrower, first end of the nozzle tip, downstream of where the first needle contacts a sidewall of the nozzle tip when the first needle is biased against the nozzle tip, and where a second portion of the plurality of injection holes are in fluid communication with the fuel passage at a wider, second end of the nozzle tip, between where the first needle and second needle contact the sidewall of the nozzle tip when the first needle and second needle are biased against the nozzle tip, the second end of the nozzle tip coupled to a body of a nozzle of the fuel injector, the body of the nozzle including the first control volume and second control volume. In another example, the second portion of the plurality of injection holes are in fluid communication with the fuel passage at the second end of the nozzle tip via a passage routed through a sidewall of the nozzle tip. In yet another example, the first control volume and second control volume are fluidly coupled to one another. In yet another example, the second control volume is formed by chamber sidewalls, a top sidewall of the fuel injector, and a top surface of the second needle, the chamber sidewalls extending downstream into the fuel injector and toward the top surface from the top sidewall, and wherein the first control volume is formed by inner sidewalls of the second needle and a top surface of the first needle. In one example, the second biasing member surrounds a portion of the first biasing member, a first end of both the first biasing member and second biasing member positioned against the top sidewall of the fuel injector. In another example, the first control volume and second control volume are fluidly coupled to one another via a passage in the top surface of the second needle and the second biasing member is contained entirely within the second control volume and the first biasing member is contained entirely within the first control volume. The fuel injector may further comprise a bleed passage disposed in sidewall of the second needle, the sidewall of the second needle arranged perpendicular to the top surface of the second needle, and wherein the bleed passage fluidly couples the first control volume with the fuel passage. The fuel injector may further comprise a floating element coupled to the top sidewall of the fuel injector at a first end of the floating element and extending through the second control volume and into the first control volume, where a second end of the floating element forms an orifice between the first control volume and the second control volume, where the second biasing member surrounds a portion of the floating element, and where the first biasing member extends between a surface of the floating element and the top surface of the first needle.

As another embodiment, a method comprises: energizing a needle actuator of a fuel injector for a first duration to move a first needle of the fuel injector from a closed position to a first open position that allows fuel to be injected from only a first set of holes arranged in a nozzle tip of the fuel injector; and energizing the needle actuator of the fuel injector for a second duration, longer than the first duration to move both the first needle and a second needle of the fuel injector from the closed position to a second open position that allows fuel to be injected from both the first set of holes and a second set of holes arranged in the nozzle tip, the first needle surrounding a portion of the second needle and the second needle positioned closer to a tip end of the nozzle tip than the first needle. In one example, during energizing the needle actuator for the second duration, first, the first needle moves away from a sidewall of the nozzle tip and fuel is injected from only the first set of holes and second, after the first duration, the second needle moves away from the sidewall of the nozzle tip and fuel is injected from both the first set of holes and the second set of holes. The method may further comprise de-energizing the needle actuator after the first duration in response to a request to only inject a smaller, first amount of fuel from the fuel injector. In one example, energizing the needle actuator for the second duration includes first injecting a first amount of fuel from the first set of holes and then injecting a second amount of fuel from the first set of holes and the second set of holes, the second amount larger than the first amount.

As another embodiment, a fuel system comprises: a common fuel rail; and a first fuel injector with a nozzle, the nozzle comprising: a fuel passage fluidly coupled to the common fuel rail; and a nozzle tip including a first plurality of holes in fluid communication with the fuel passage downstream of where a first needle and a second needle of the nozzle are positioned against the nozzle tip in a closed position where no fuel is injected from the nozzle, and at least one second hole in fluid communication with the fuel passage upstream of the first plurality of holes and between where the first needle and second needle are positioned against the nozzle tip in the closed position, the first needle surrounding at least a portion of the second needle. The fuel system may further comprise a needle actuator including an electromagnetic solenoid adapted to open a fluid passage coupled between a first control volume of the nozzle and a fuel tank. In one example, the first control volume is positioned vertically above, relative to a central vertical axis of the first fuel injector, the first needle and second needle and wherein the nozzle of the first fuel injector further includes a second control volume positioned vertically below the first control volume and within an inner wall of the first needle, the first control volume and second control volume fluidly coupled to one another. The fuel system may further comprise a second fuel injector coupled upstream of a first cylinder, where the first fuel injector is coupled to the first cylinder and adapted to inject a liquid fuel into the first cylinder, and wherein the second fuel injector is adapted to inject a gaseous fuel upstream of the first cylinder.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," or the like are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
    energizing a needle actuator of a fuel injector for a first duration to oppose a force of a first biasing member to move a first needle of the fuel injector from a closed position of the first needle to an open position of the first needle that allows fuel to be flowed from a fuel passage and injected through only a first set of holes arranged in a nozzle tip of the fuel injector; and
    continuously energizing the needle actuator of the fuel injector by a power source for a second duration that is longer than the first duration, wherein continuously energizing the needle actuator for the second duration opposes the force of the first biasing member to move the first needle to the open position of the first needle whereby fuel is flowed from the fuel passage and injected from only the first set of holes, and then opposes a force of a second biasing member to move a second needle of the fuel injector from a closed position of the second needle to an open position of the second needle while the first needle is maintained in the open position of the first needle,
    wherein both the first needle being moved into the open position of the first needle and the second needle being moved into the open position of the second needle allows fuel to be flowed from the fuel passage and injected through both the first set of holes and a second set of holes arranged in the nozzle tip, the first needle surrounding a portion of the second needle and the second needle positioned closer to a tip end of the nozzle tip than the first needle,
    wherein the first biasing member and the second biasing member are surrounded by chamber walls, wherein the chamber walls are positioned within a nozzle body of the fuel injector,
    wherein the first biasing member and the second biasing member are separated from the fuel passage via the chamber walls, wherein the fuel passage is formed between the chamber walls and an inner surface of the nozzle body, and
    wherein the power source is an alternator/generator or a battery.

2. The method of claim 1, wherein during energizing the needle actuator for the second duration, first the first needle moves away from a sidewall of the nozzle tip and fuel is injected from only the first set of holes and second, after the first duration, the second needle moves away from the sidewall of the nozzle tip and fuel is injected from both the first set of holes and the second set of holes.

3. The method of claim 1, wherein the needle actuator is de-energized after the first duration in response to a request to only inject a first amount of fuel from the fuel injector, where the first amount of fuel is less than a predetermined threshold amount of fuel.

4. The method of claim 1, wherein energizing the needle actuator for the second duration includes first injecting a first amount of fuel from the first set of holes and then injecting a second amount of fuel from the first set of holes and the second set of holes, the second amount larger than the first amount.

5. The method of claim 1, wherein the needle actuator is a valve.

6. The method of claim 1, wherein an inner diameter of each hole of the first set of holes is smaller than an inner diameter of each hole of the second set of holes.

7. A method, comprising:
    determining a first desired amount of fuel from a fuel injector;
    responsive to determining the first desired amount of fuel from the fuel injector, energizing a needle actuator of the fuel injector for a first duration to oppose a force of a first biasing member to move a first needle of the fuel injector from a closed position of the first needle to an open position of the first needle, and de-energizing the needle actuator upon completion of the first duration, wherein the first duration is a pre-determined amount of time;
    wherein the fuel injector includes a plurality of injection holes, the plurality of injection holes including at least one first injection hole, the at least one first injection hole positioned between at least one second injection hole and a body of a nozzle of the fuel injector, and wherein moving the first needle of the fuel injector from the closed position of the first needle to the open position of the first needle allows fuel to be flowed from a fuel passage and injected through only flow through the at least one first injection hole;

determining a second desired amount of fuel from the fuel injector, where the second desired amount of fuel is greater than the first desired amount of fuel; and responsive to determining the second desired amount of fuel from the fuel injector, continuously energizing the needle actuator of the fuel injector by a power source for a second duration, wherein the second duration is longer than the first duration, wherein continuously energizing the needle actuator for the second duration opposes the force of the first biasing member to move the first needle to the open position of the first needle whereby fuel is flowed from the fuel passage and injected from only the at least one first injection hole, and then opposes a force of a second biasing member to move a second needle of the fuel injector from a closed position of the second needle to an open position of the second needle while the first needle is maintained in the open position of the first needle, and de-energizing the needle actuator upon completion of the second duration, wherein an amount of time of a second duration is based on the second desired amount of fuel, wherein both the first needle being moved into the open position of the first needle and the second needle being moved into the open position of the second needle allows fuel to be flowed from the fuel passage and injected from both the at least one first injection hole and the at least one second injection hole, the first needle surrounding a portion of the second needle and the second needle positioned closer to a tip end of the nozzle than the first needle, wherein the first biasing member and the second biasing member are surrounded by chamber walls, wherein the chamber walls are positioned within the body of the nozzle of the fuel injector, wherein the first biasing member and the second biasing member are separated from the fuel passage via the chamber walls, wherein the fuel passage is formed between the chamber walls and an inner surface of the body of the nozzle of the fuel injector, and wherein the power source is an alternator/generator or a battery.

8. The method of claim 7, wherein the needle actuator is a valve.

9. The method of claim 8, wherein an inner diameter of each of the at least one first injection hole is smaller than an inner diameter of each of the at least one second injection hole.

* * * * *